(12) United States Patent
Hu et al.

(10) Patent No.: US 12,245,275 B2
(45) Date of Patent: Mar. 4, 2025

(54) MULTI-BEAM LBT FOR NR-U AT 60 GHZ

(71) Applicant: Samsung Electronics Co., Ltd., Suwon-si (KR)

(72) Inventors: Liang Hu, San Diego, CA (US); Jung Hyun Bae, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/585,037

(22) Filed: Feb. 22, 2024

(65) Prior Publication Data

US 2024/0196435 A1    Jun. 13, 2024

Related U.S. Application Data

(63) Continuation of application No. 17/377,369, filed on Jul. 15, 2021, now Pat. No. 11,956,818.

(Continued)

(51) Int. Cl.
*H04W 74/0808* (2024.01)
*H04W 16/14* (2009.01)
*H04W 84/04* (2009.01)

(52) U.S. Cl.
CPC ........ *H04W 74/0808* (2013.01); *H04W 16/14* (2013.01); *H04W 84/042* (2013.01)

(58) Field of Classification Search
CPC ............. H04W 74/0808; H04W 16/14; H04W 84/042; H04W 24/08; H04W 52/0219;

(Continued)

(56) References Cited

U.S. PATENT DOCUMENTS 8,670,719 B2    3/2014 Bergel et al.
2006/0266917 A1    11/2006 Baldis et al.
(Continued)

FOREIGN PATENT DOCUMENTS

CN    108370298 A  *  8/2018   ........... H04B 7/0452
CN    110351764 A  *  10/2019  ............. H04B 17/30
(Continued)

OTHER PUBLICATIONS

European Extended Search Report for Application No. 21189924.0, mailed Jan. 4, 2022.
(Continued)

*Primary Examiner* — Ayaz R Sheikh
*Assistant Examiner* — Louis Samara
(74) *Attorney, Agent, or Firm* — Renaissance IP Law Group LLP

(57) ABSTRACT

A system and a method are disclosed for accessing a wireless medium for a NR-U deployed at 60 GHz. A directional CCA sensing is performed on a set of multiple beams in the medium in which each beam is oriented in a different direction. It is determined whether at least one beam of is busy and, if so, a back-off timer is initialized. The back-off timer is decreased by a predetermined amount based on a determination that all beams of the set of multiple beams are idle. The back-off timer is repeatedly decreased the predetermined amount based on a determination that all beams of the set of multiple beams are idle until the back-off timer equals a predetermined amount. Data is transmitted at least one beam of the set of multiple beams based on the back-off timer equaling the predetermined amount.

20 Claims, 13 Drawing Sheets

Related U.S. Application Data

(60) Provisional application No. 63/138,388, filed on Jan. 15, 2021, provisional application No. 63/080,664, filed on Sep. 18, 2020, provisional application No. 63/062,427, filed on Aug. 6, 2020.

(58) Field of Classification Search
CPC ... H04B 7/0408; H04B 7/0617; H04B 7/0695
See application file for complete search history.

(56) References Cited

U.S. PATENT DOCUMENTS

| | | | |
|---|---|---|---|
| 2016/0037560 A1 | 2/2016 | Liu et al. | |
| 2016/0105897 A1* | 4/2016 | Liu | H04W 72/54 370/235 |
| 2017/0311260 A1* | 10/2017 | Trainin | H04W 52/0219 |
| 2018/0115996 A1* | 4/2018 | Si | H04W 74/0808 |
| 2018/0310137 A1 | 10/2018 | Mouhouche et al. | |
| 2018/0352577 A1* | 12/2018 | Zhang | H04B 7/08 |
| 2019/0053083 A1* | 2/2019 | Kwon | H04W 74/0808 |
| 2019/0373635 A1 | 12/2019 | Yang et al. | |
| 2020/0228991 A1* | 7/2020 | Jiang | H04W 74/0808 |
| 2020/0252806 A1* | 8/2020 | Yerramalli | H04W 72/541 |
| 2020/0404665 A1 | 12/2020 | Ryu et al. | |
| 2022/0039152 A1* | 2/2022 | Shi | H04W 74/0808 |
| 2022/0272681 A1* | 8/2022 | Harada | H04W 48/12 |
| 2022/0330337 A1* | 10/2022 | Oteri | H04W 24/08 |
| 2023/0015536 A1* | 1/2023 | Goyal | H04B 7/0695 |

FOREIGN PATENT DOCUMENTS

| | | | | |
|---|---|---|---|---|
| CN | 109983826 B | * | 8/2022 | ............ H04W 16/14 |
| CN | 108886809 B | * | 12/2022 | ........ H04W 52/0219 |
| KR | 101820733 B1 | | 1/2018 | |
| TW | 201924279 A | | 6/2019 | |
| WO | 2019079500 A1 | | 4/2019 | |
| WO | WO-2021155929 A1 | * | 8/2021 | |

OTHER PUBLICATIONS

European Extended Search Report for Application No. 21189924.0, mailed May 7, 2024.
Notice of Allowance for U.S. Appl. No. 17/377,369, mailed Aug. 17, 2023.
Notice of Allowance for U.S. Appl. No. 17/377,369, mailed Nov. 30, 2023.
Office Action for U.S. Appl. No. 17/377,369, mailed Mar. 3, 2023.

\* cited by examiner

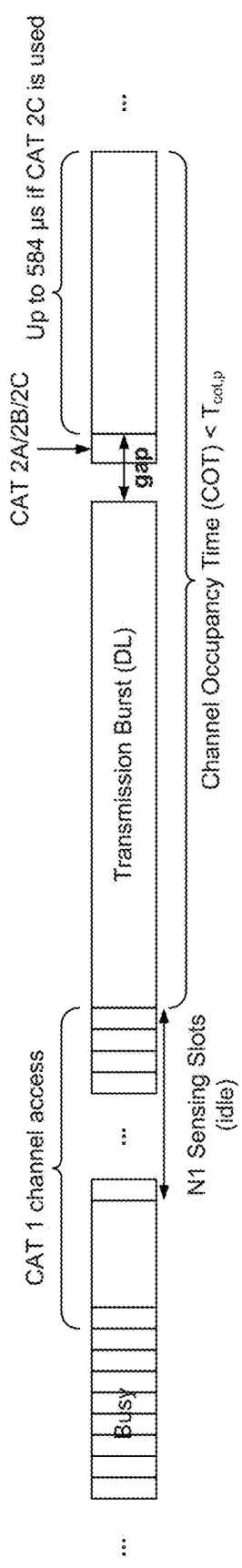
FIG. 9
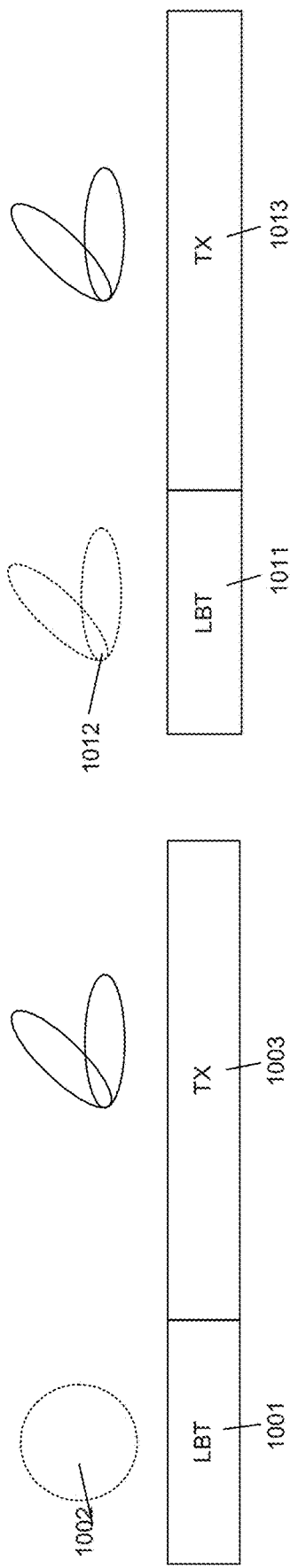
FIG. 10A
FIG. 10B

MULTI-BEAM LBT FOR NR-U AT 60 GHZ

CROSS-REFERENCE TO RELATED APPLICATION

This patent application is a continuation of U.S. patent application Ser. No. 17/377,369, filed on Jul. 15, 2021, which claims the priority benefit under 35 U.S.C. § 119(e) of U.S. Provisional Patent Application Ser. No. 63/062,427, filed on Aug. 6, 2020, U.S. Provisional Patent Application Ser. No. 63/080,664, filed on Sep. 18, 2020, and U.S. Provisional Patent Application Ser. No. 63/138,388, filed on Jan. 15, 2021, the disclosures of which are incorporated herein by reference in their entirety.

TECHNICAL FIELD

The subject matter disclosed herein generally relates to wireless communication systems. More specifically, the subject matter disclosed herein relates to a 5th Generation (5G) of wireless technology for new radio interface and radio access technology in an unlicensed spectrum (NR-U) deployed at 60 GHz channel access procedure that uses a multi-beam Listen Before Transmit (LBT) technique.

BACKGROUND

When a 5G NR-U is deployed at 60 GHz as part of either a single transmission and reception point (TRP) or a multi-TRP architecture, there may be many active beams having a finer spatial granularity between the TRPs and user equipment (UE). The multiple beams may be used to take advantage of spatial diversity and spatial multiplexing for transmissions. If a transmission is on an unlicensed band, the multiple beams may also be used to increase the possibility of successful channel occupation. The channel access procedure for IEEE WiGi and NR-U Release 16 is currently based on an omnidirectional LBT.

SUMMARY

An example embodiment provides a transceiver that may include multiple transmit and reception points, a receiver and a transceiver. The multiple transmit and reception points may be configured to transmit multiple beams in a wireless communication medium in which each beam of the multiple beams may be oriented in a direction that is different from a direction of each other beam of the multiple beams. The receiver may be coupled to the multiple transmission and reception points, and the transmitter may be coupled to the multiple transmission and reception points. The transceiver may be configured to: perform a directional clear channel assessment sensing on at least one beam of the multiple beams in the wireless communication medium, determine whether at least one beam of the multiple beams is busy; initialize a back-off timer based on a determination that at least one beam is busy; decrease the back-off timer a predetermined amount based on a determination that at least one beam of the multiple beams are idle; and transmit data over at least one beam of the multiple beams based on the back-off timer equaling a predetermined amount. In one embodiment, the transceiver may be further configured to transmit data over at least one beam of the multiple beams further based on all beams of the multiple beams being idle for an additional predetermined duration. In another embodiment, the transceiver may be further configured to transmit data over at least one beam of the multiple beams based on a determination that all beams of the multiple beams are idle. In still another embodiment, the transceiver may be further configured to initialize a first back-off timer corresponding to each first beam determined to be busy, and the transceiver may be further configured to: decrease a first back-off timer based on the determination that the first beam corresponding to the first back-off timer is idle; and transmit data over the first beam based on the first back-off timer corresponding to the first beam equaling the predetermined amount. In one embodiment, the transceiver may be configured to transmit data further based on the first beam being idle for an additional predetermined duration. In yet another embodiment, the transceiver is further configured to: send a reservation request message based on the first back-off timer equaling the predetermined amount; determine whether a reservation acknowledgement message has been received by the transmitter; and transmit data over at least one beam of the multiple beams based on the reservation acknowledgement message being received. In one embodiment, the transceiver may be configured to send the reservation request message further based on the first beam being idle for an additional predetermined duration. In another embodiment, the transceiver is further configured to: send a reservation request message based on the back-off timer equaling the predetermined amount; determine whether a reservation acknowledgement message has been received by the transmitter; and transmit data over at least one beam of the multiple beams based on the reservation acknowledgement message being received. The transceiver may be further configured to send the reservation request message further based on a beam over which the reservation request message is send being idle for an additional predetermined duration. In one embodiment, the at least one beam may be a primary beam, other beams of the multiple beams may be secondary beams, and the transceiver may be further configured to perform directional clear channel assessment sensing on the primary beam; determine whether the primary beam is busy; initialize the back-off timer based on a determination that the primary beam is busy; decrease the back-off timer the predetermined amount based on a determination that the primary beam is idle; determine whether the primary beam is idle for a first predetermined duration of time; determine whether at least one secondary beam is idle for a second predetermined duration of time using a listen-before-transmit technique based on the primary beam being idle for the first predetermined duration of time; and transmit data over the primary beam based on the primary beam being idle for the first predetermined duration of time and over each secondary beam that has been idle for the second predetermined duration of time. In all embodiments, the transceiver may be a transmission and reception point or a user equipment.

An example embodiment provides a wireless communication system that may include a transmitter that is configured to transmit multiple beams in a wireless communication medium in which each beam of the multiple beams may be oriented in a direction that is different from a direction of each other beam of the multiple beams. The transmitter may be further configured to: perform a directional clear channel assessment sensing on at least one beam of the multiple beams in the wireless communication medium, determine whether at least one beam of the multiple beams is busy; initialize a back-off timer based on a determination that at least one beam is busy; decrease the back-off timer a predetermined amount based on a determination that all beams of the multiple beams are idle; and transmit data over at least one beam of the multiple beams based on the back-off timer equaling a predetermined amount. In one embodiment, the transmitter may be further configured to transmit data over at least one beam of the multiple beams further based on all beams of the multiple beams being idle for an additional predetermined duration. In another embodiment, the transmitter may be further configured to transmit data over at least one beam of the multiple beams based on a determination that all beams of the multiple beams are idle. In still another embodiment, the transmitter may be further configured to initialize a first back-off timer corresponding to each first beam determined to be busy. In yet another embodiment, the transmitter is further configured to: decrease a first back-off timer based on the determination that the first beam corresponding to the first back-off timer is idle; and transmit data over the first beam based on the first back-off timer corresponding to the first beam equaling the predetermined amount. The transmitter may be configured to transmit data further based on the first beam being idle for an additional predetermined duration. In one embodiment, the transmitter may be further configured to: send a reservation request message based on the first back-off timer equaling the predetermined amount; determine whether a reservation acknowledgement message has been received by the transmitter; and transmit data over at least one beam of the multiple beams based on the reservation acknowledgement message being received. The transmitter may be configured to send the reservation request message further based on the first beam being idle for an additional predetermined duration. In another embodiment, the transmitter may be further configured to: send, a reservation request message based on the back-off timer equaling the predetermined amount; determine whether a reservation acknowledgement message has been received by the transmitter; and transmit data over at least one beam of the multiple beams based on the reservation acknowledgement message being received. The transmitter may be further configured to send the reservation request message further based on a beam over which the reservation request message is send being idle for an additional predetermined duration. In another embodiment, the at least one beam may be a primary beam, other beams of the multiple beams may be secondary beams, and the transmitter may be further configured to: perform directional clear channel assessment sensing on the primary beam of the multiple beams; determine whether the primary beam is busy; initialize the back-off timer based on a determination that the primary beam is busy; decrease the back-off timer the predetermined amount based on a determination that the primary beam is idle; determine whether the primary beam is idle for a first predetermined duration of time; determine whether at least one secondary beam is idle for a second predetermined duration of time using a listen-before-transmit technique based on the primary beam being idle for the first predetermined duration of time; and transmit data over the primary beam based on the primary beam being idle for the first predetermined duration of time and over each secondary beam that has been idle for the second predetermined duration of time. For all embodiments, the transmitter may be a transmission and reception point or a user equipment.

An example embodiment provides a method for accessing a wireless medium that may include: performing, at a transmitter, a directional clear channel assessment sensing on a set of multiple beams in the wireless medium, each beam of the set of multiple beams being oriented in a direction that is different from a direction of each other beam of the set of multiple beams; determining, at the transmitter, whether at least one beam of the set of multiple beams is busy; initializing, at the transmitter, a back-off timer based on a determination that at least one beam is busy; decreasing, at the transmitter, the back-off timer a predetermined amount based on a determination that all beams of the set of multiple beams are idle; and transmitting, by the transmitter, data over at least one beam of the set of multiple beams based on the back-off timer equaling a predetermined amount. In one embodiment, transmitting may be further based on all beams of the multiple beams being idle for an additional predetermined duration. In another embodiment, the method may further include transmitting, by the transmitter, data over at least one beam of the set of multiple beams based on a determination that all beams of the set of multiple beams are idle. In still another embodiment, initializing the back-off timer based on determining that at least one beam is busy may further include initializing a first back-off timer corresponding to each first beam determined to be busy. In yet another embodiment, the method may further include: decreasing a first back-off timer based on determining that the first beam corresponding to the first back-off timer is idle; and transmitting data over the first beam based on the first back-off timer corresponding to the first beam equaling the predetermined amount. Transmitting data of the first beam may further be based on the first beam being idle for an additional predetermined duration. In another embodiment, transmitting data over at least one beam of the set of multiple beams based on the first back-off timer corresponding to the first beam equaling the predetermined amount may further include: sending, by the transmitter, a reservation request message based on the first back-off timer equaling the predetermined amount; determining whether a reservation acknowledgement message has been received by the transmitter; and transmitting, by the transmitter, data over at least one beam of the set of multiple beams based on the reservation acknowledgement message being received. Transmitting data over the at least one beam may be further based on the first beam being idle for an additional predetermined duration. In another embodiment, transmitting data over at least one beam of the set of multiple beams based on the back-off timer equaling the predetermined amount may further include: sending, by the transmitter, a reservation request message based on the back-off timer equaling the predetermined amount; determining whether a reservation acknowledgement message has been received by the transmitter; and transmitting, by the transmitter, data over at least one beam of the set of multiple beams based on the reservation acknowledgement message being received. Transmitting data of the at least on beam may be further based on a beam over which the reservation request message is send being idle for an additional predetermined duration. In one embodiment, the at least one beam may be a primary beam, other beams of the multiple beams may be secondary beams, and performing the directional clear channel assessment sensing on a set of multiple beams in the wireless medium may include: performing the directional clear channel assessment sensing on the primary beam, initializing the back-off timer may include initializing the back-off timer based on a determination that the primary beam is busy, decreasing the back-off timer may include decreasing the back-off timer the predetermined amount based on a determination that the primary beam is idle, and the method may further include: determining whether the primary beam is idle for a first predetermined duration of time; determining whether at least one secondary beam is idle for a second predetermined duration of time using a listen-before-transmit technique based on the primary beam being idle for the first predetermined duration of time; and transmitting data over the primary beam based on the primary beam being idle for the first predetermined duration of time and over each secondary beam that has been idle for the second predetermined duration of time. In all embodiments of the method disclosed herein, the transmitter may be a transmission and reception point, or a user equipment.

BRIEF DESCRIPTION OF THE DRAWING

In the following section, the aspects of the subject matter disclosed herein will be described with reference to exemplary embodiments illustrated in the figures, in which:

FIG. 9 depicts the four legacy categories of LBT for a single channel For NR-U channel access in the $3^{rd}$ Generation Partnership Project (3GPP);

FIGS. 10A and 10B respectively depict a legacy omnidirectional LBT process and a directional LBT process according to the subject matter disclosed herein;

DETAILED DESCRIPTION

Figure 1:
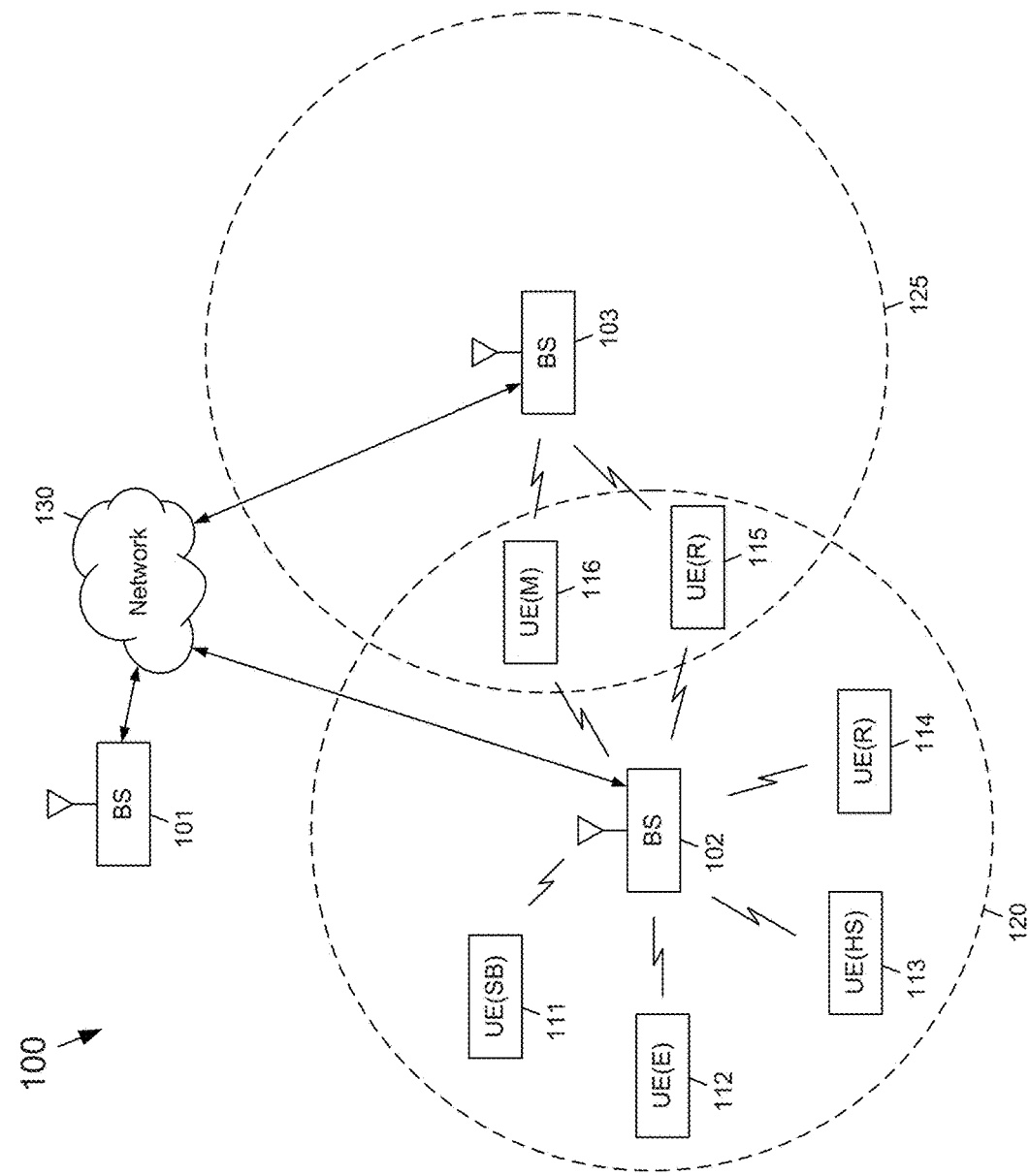
FIG. 1 depicts an example embodiment of a wireless communication network according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

FIGS. 1-15, described below, and the various embodiments used to illustrate the subject matter disclosed herein are only by way of example and should not be construed in any way to limit the scope of the subject matter disclosed herein. It should be understood that the subject matter disclosed herein may be implemented in any suitably arranged system or device.

At least the following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

Figure 2:
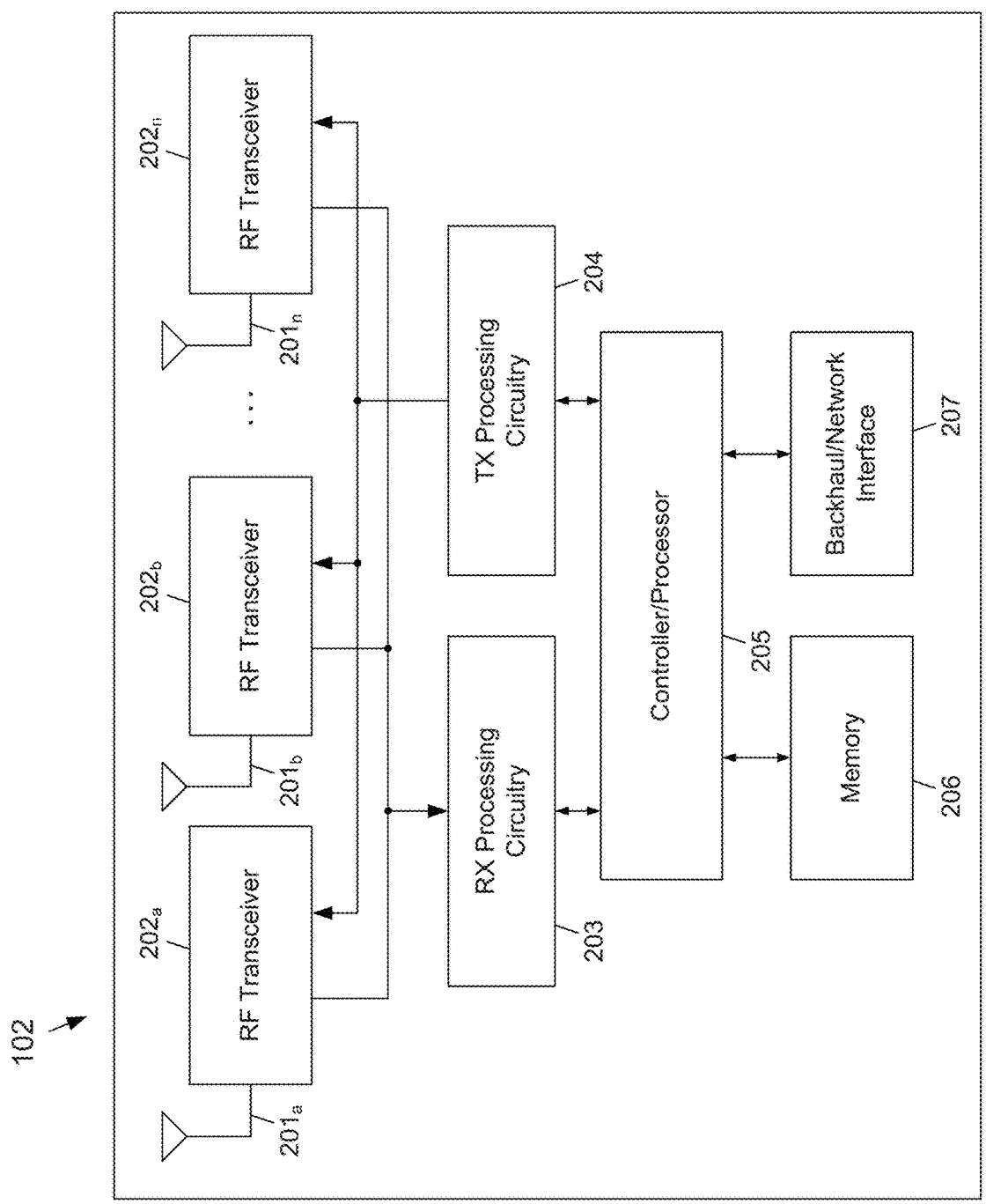
FIG. 2 depicts an example embodiment of a base station according to the subject matter disclosed herein.
Figure 3:
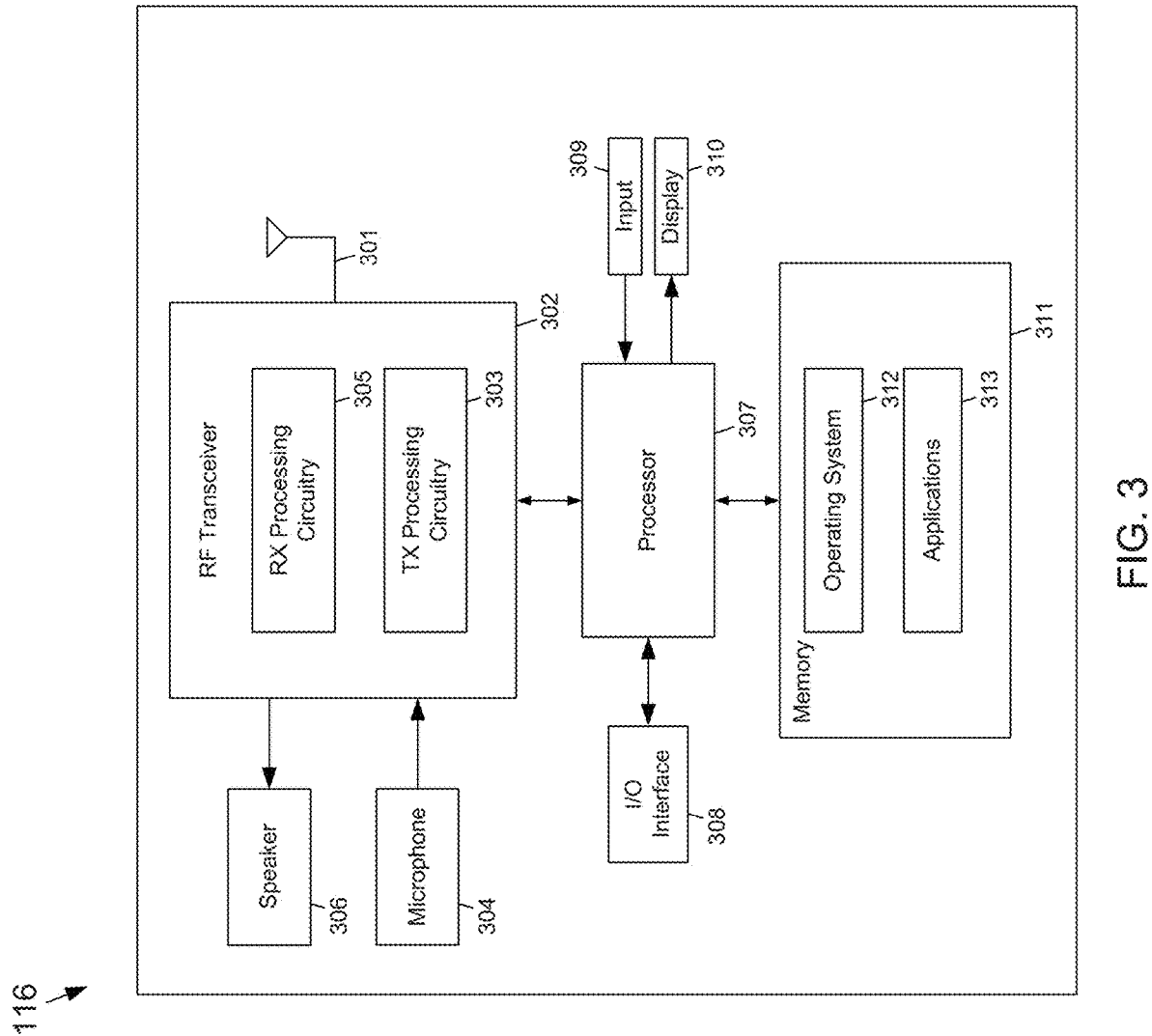
FIG. 3 depicts an example embodiment of a user equipment according to the subject matter disclosed herein.

FIGS. 1-5 depict various example embodiments implemented in wireless communications systems and use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the subject matter disclosed herein may be implemented in any suitably-arranged communications system.

FIG. 1 depicts an example embodiment of a wireless communication network 100 according to the subject matter disclosed herein. The example embodiment of the wireless network depicted in FIG. 1 is for illustration only. Other embodiments of the wireless network 100 may be used without departing from the principles of the subject matter disclosed herein.

As depicted in FIG. 1, the wireless network 100 includes a gNB 101 (e.g., base station, BS), a gNB 102, and a gNB 103. The gNB 101 may communicate with the gNB 102 and the gNB 103. The gNB 101 may also communicate with at least one network 130, such as the internet, a proprietary Internet Protocol (IP) network, or other data network.

The gNB 102 may provide wireless broadband access to the network 130 for a first plurality of UEs within a coverage area 120 of the gNB 102. The first plurality of UEs may include a UE 111 that may be located in a small business (SB); a UE 112 that may be located in an enterprise I; a UE 113 that may be located in a WiFi hotspot (HS); a UE 114 that may be located in a first residence I; a UE 115 that may be located in a second residence I; and a UE 116 that may be a mobile device (M), such as, but not limited to, a cell phone, a wireless laptop, a wireless PDA, or the like. The gNB 103 may provide wireless broadband access to the network 130 for a second plurality of UEs within a coverage area 125 of the gNB 103. The second plurality of UEs may include the UE 115 and the UE 116. In some embodiments, one or more of the gNBs 101-103 may communicate with each other and with the UEs 111-116 using 5G/NR, LTE, LTE-A, WiMAX, WiFi, and/or other wireless communication techniques.

Depending on the network type, the term "base station" or "BS" may refer to any component (or collection of components) configured to provide wireless access to a network, such as a transmit point (TP), a transmit-receive point (TRP), an enhanced base station (eNodeB or eNB), a 5G/NR base station (gNB), a microcell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" may refer to any component such as "mobile station," "subscriber station," "remote terminal," "wireless terminal," "receive point," or "user device." For the sake of convenience, the terms "user equipment" and "UE" may be used herein to refer to remote wireless equipment that wirelessly accesses a BS, whether the UE is a mobile device (such as, but not limited to, a mobile telephone or smartphone) or is normally considered a stationary device (such as, but not limited to, a desktop computer or vending machine).

Dotted lines depict approximate extents of the coverage areas 120 and 125, which are depicted as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 may include circuitry, programming, or a combination thereof, for efficient control signaling designed for improved resource utilization. In certain embodiments, and one or more of the gNBs 101-103 may include circuitry, programming, or a combination thereof, for efficient control signaling designed for improved resource utilization.

Although FIG. 1 depicts one example of a wireless network, various changes may be made to FIG. 1. For example, the wireless network 100 could include any number of gNBs and any number of UEs in any suitable arrangement. Also, the gNB 101 may communicate directly with any number of UEs and provide those UEs with wireless broadband access to the network 130. Similarly, each gNB 102-103 may communicate directly with the network 130 and provide UEs with direct wireless broadband access to the network 130. Further, the gNBs 101, 102, and/or 103 may provide access to other or additional external networks, such as, but not limited to, external telephone networks or other types of data networks.

FIG. 2 depicts an example embodiment of the gNB 102 according to the subject matter disclosed herein. The embodiment of the gNB 102 depicted in FIG. 2 is for illustration only, and the gNBs 101 and 103 of FIG. 1 may have the same or a similar configuration. However, gNBs come in a wide variety of configurations, and it should be understood that FIG. 2 does not limit the scope of the subject matter disclosed herein to any particular implementation of a gNB.

As depicted in FIG. 2, the gNB 102 may include multiple antennas 201a-201n, multiple radio frequency (RF) transceivers 202a-202n, receive (RX) processing circuitry 203, and transmit (TX) processing circuitry 204. The gNB 102 may also include a controller/processor 205, a memory 206, and/or a backhaul or network interface 207. The TX processing circuitry 204 may include a controller/processor that is not shown and that controls the TX processing circuitry 204 to perform transmission-related functionality as disclosed herein. Alternatively, the controller/processor 205 may be configured to control the TX processing circuitry 204 to perform transmission-related functionality as disclosed herein.

The RF transceivers 202a-202n may receive incoming RF signals from the antennas 201a-201n. The received RF signals may be signals transmitted by UEs in the network 100. The RF transceivers 202a-202n may down-convert the incoming RF signals to generate IF or baseband signals. The IF or baseband signals may be sent to the RX processing circuitry 203, which generates processed baseband signals by filtering, decoding, and/or digitizing the baseband or IF signals. The RX processing circuitry 203 may transmit the processed baseband signals to the controller/processor 255 for further processing.

The TX processing circuitry 204 may receive analog or digital data (such as, but not limited to, voice data, web data, e-mail, or interactive video game data) from the controller/processor 225. The TX processing circuitry 204 may encode, multiplex, and/or digitize the outgoing baseband data to generate processed baseband or IF signals. The RF transceivers 202a-202n may receive the outgoing processed baseband or IF signals from the TX processing circuitry 204 and may up-convert the baseband or IF signals to RF signals that are transmitted via the antennas 201a-201n. The TX processing circuitry 204 may be configured so that one or more beams are transmitted via the antennas 201a-201n The controller/processor 205 may include one or more processors or other processing devices that may control the overall operation of the gNB 102. For example, the controller/processor 205 may control the reception of forward channel signals and the transmission of reverse channel signals by the RF transceivers 202a-202n, the RX processing circuitry 203, and the TX processing circuitry 204 in accordance with well-known principles. The controller/processor 205 may support additional functions as well, such as more advanced wireless communication functions. For instance, the controller/processor 205 may support beamforming or directional-routing operations in which outgoing/incoming signals from/to multiple antennas 201a-201n may be weighted differently to effectively steer the outgoing signals in a desired direction. Any of a wide variety of other functions may be supported in the gNB 102 by the controller/processor 205.

The controller/processor 205 may also be capable of executing programs and other processes resident in the memory 206, such as an operating system (OS). The controller/processor 205 may move data into or out of the memory 206, which may be coupled to the controller/processor 205, as required by an executing process. Part of the memory 206 may include a random-access memory (RAM), and another part of the memory 206 may include a flash memory or other read-only memory (ROM).

The controller/processor 205 may also be coupled to the backhaul or network interface 207. The backhaul or network interface 207 may allow the gNB 102 to communicate with other devices or systems over a backhaul connection or over a network. The interface 207 may support communications over any suitable wired or wireless connection(s). For example, when the gNB 102 is implemented as part of a cellular communication system (such as a gNB supporting 5G/NR, LTE, or LTE-A), the interface 207 may allow the gNB 102 to communicate with other gNBs over a wired or wireless backhaul connection. When the gNB 102 is implemented as an access point, the interface 207 may allow the gNB 102 to communicate over a wired or wireless local area network or over a wired or wireless connection to a larger network (such as the internet). The interface 207 may include any suitable structure supporting communications over a wired or wireless connection, such as an Ethernet or an RF transceiver.

Although FIG. 2 depicts one example of gNB 102, various changes may be made to FIG. 2. For example, the gNB 102 may include any number of each component shown in FIG. 2. As a particular example, an access point may include a number of interfaces 207, and the controller/processor 205 may support routing functions to route data between different network addresses. As another particular example, while shown as including a single instance of TX processing circuitry 204 and a single instance of RX processing circuitry 203, the gNB 102 may include multiple instances of each (such as one per RF transceiver). Also, various components in FIG. 2 may be combined, further subdivided, or omitted and additional components may be added according to particular needs.

FIG. 3 depicts an example embodiment of UE 116 according to the subject matter disclosed herein. The embodiment of the UE 116 depicted in FIG. 3 is for illustration only, and the UEs 111-115 of FIG. 1 could have the same or similar configuration. UEs, however, may come in a wide variety of configurations, and FIG. 3 does not limit a UE to be any particular implementation of a UE.

As depicted in FIG. 3, the UE 116 may include one or more antennas 301, an RF transceiver 302, TX processing circuitry 303, a microphone 304, and RX processing circuitry 305. The UE 116 may also include a speaker 360, a processor 307, an input/output (I/O) interface (IF) 308, a touchscreen 309 (or other input device), a display 310, and a memory 311. The memory 311 may include an OS 312 and one or more applications 313. The TX processing circuitry 303 may include a controller/processor that is not shown and that may be configured to control the TX processing circuitry 303 to perform transmission-related functionality as disclosed herein. Alternatively, the processor 307 may be configured to control the TX processing circuitry 303 to perform transmission-related functionality as disclosed herein.

The RF transceiver 302 may receive an incoming RF signal, from the one or more antennas 301, that has been transmitted by a gNB of the network 100. The RF transceiver 302 may down-convert the incoming RF signal to generate an intermediate frequency (IF) or baseband signal. The IF or baseband signal may be sent to the RX processing circuitry 325, which generates a processed baseband signal by filtering, decoding, and/or digitizing the baseband or IF signal. The RX processing circuitry 325 may transmit the processed baseband signal to the speaker 330 (such as for voice data) or to the processor 340 for further processing (such as for web browsing data).

The TX processing circuitry 303 may receive analog or digital voice data from the microphone 304 or other outgoing baseband data (such as web data, e-mail, or interactive video game data) from the processor 307. The TX processing circuitry 303 may encode, multiplex, and/or digitize the outgoing baseband data to generate a processed baseband or IF signal. The RF transceiver 302 may receive the outgoing processed baseband or IF signal from the TX processing circuitry 303 and up-convert the baseband or IF signal to an RF signal that is transmitted via the one or more antennas 301. The TX processing circuitry 303 may be configured to transmit one or more beams from the one or more antennas 301

The processor 307 may include one or more processors or other processing devices and may execute the OS 312 stored in the memory 311 in order to control the overall operation of the UE 116. For example, the processor 307 may control the reception of forward channel signals and the transmission of reverse channel signals by the RF transceiver 302, the TX processing circuitry 303, and the RX processing circuitry 305 in accordance with well-known principles. In some embodiments, the processor 307 may at least one microprocessor or microcontroller.

The processor 370 may also be capable of executing other processes and programs resident in the memory 311, such as processes for beam management. The processor 307 may move data into or out of the memory 311 as required by an executing process. In some embodiments, the processor 307 may be configured to execute the applications 313 based on the OS 361 or in response to signals received from gNBs or from an operator. The processor 307 may also be coupled to the I/O interface 308, which may provide the UE 116 with the ability to connect to other devices, such as, but not limited to, laptop computers and handheld computers. The I/O interface 308 is the communication path between these accessories and the processor 307.

The processor 307 may also be coupled to the touchscreen 309 and the display 310. An operator of the UE 116 may use the touchscreen 309 to enter data into the UE 116. The display 310 may be a liquid crystal display, light emitting diode display, or other display capable of rendering text and/or at least limited graphics, such as from web sites.

The memory 311 may be coupled to the processor 307. Part of the memory 311 may include RAM and another part of the memory 311 may include a flash memory or other ROM.

Although FIG. 3 depicts one example embodiment of the UE 116, various changes may be made to FIG. 3. For example, various components in FIG. 3 may be combined, further subdivided, or omitted and additional components may be added according to particular needs. As a particular example, the processor 340 may be divided into multiple processors, such as one or more central processing units (CPUs) and one or more graphics processing units (GPUs). Also, while FIG. 3 depicts the UE 116 configured as a mobile telephone or smartphone, UEs may be configured to operate as other types of mobile or stationary devices.

To meet the demand for wireless data traffic that has increased since deployment of 4G communication systems, efforts have been made to develop an improved 5G/NR or pre-5G/NR communication system. Therefore, the 5G/NR or pre-5G/NR communication system may be also referred to as a "beyond 4G network" or a "post LTE system." The 5G/NR communication system may be considered to be implemented in higher frequency (mm Wave) bands, e.g., 28 GHZ or 60 GHz bands or, in general, above 6 GHz bands, to accomplish higher data rates or in lower frequency bands, such as below 6 GHZ, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques as used in 5G/NR communication systems. Additionally, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

A communication system may include a downlink (DL) that refers to transmissions from a base station or one or more transmission points to UEs and an uplink (UL) that refers to transmissions from UEs to a base station or to one or more reception points.

A unit for DL signaling or for UL signaling on a cell may be referred to as a slot and may include one or more symbols. A symbol may also serve as an additional time unit. A frequency (or bandwidth (BW)) unit may be referred to as a resource block (RB). One RB may include a number of sub-carriers (SCs). For example, a slot may have duration of 0.5 milliseconds or 1 millisecond, include 14 symbols, and an RB may include 12 SCs with inter-SC spacing of 30 kHz or 15 kHz, respectively. A unit of one RB in frequency and one symbol in time may be referred to as physical RB (PRB).

DL signals may include data signals conveying information content, control signals conveying DL control information (DCI), and reference signals (RS) that may also be known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. For brevity, a DCI format scheduling a PDSCH reception by a UE may be referred to as a DL DCI format and a DCI format scheduling a PUSCH transmission from a UE is referred to as an UL DCI format.

A gNB may transmit one or more of multiple types of RS including channel state information RS (CSI-RS) and demodulation RS (DM-RS). A CSI-RS may be primarily intended for UEs to perform measurements and provide channel state information (CSI) to a gNB. For channel measurement, non-zero power CSI-RS (NZP CSI-RS) resources may be used. For interference measurement reports (IMRs), CSI interference measurement (CSI-IM) resources may be used. A CSI process may include NZP CSI-RS and CSI-IM resources.

A UE may determine CSI-RS transmission parameters through DL control signaling or higher-layer signaling, such as radio resource control (RRC) signaling, from a gNB. Transmission instances of a CSI-RS may be indicated by DL control signaling or be configured by higher layer signaling. A DM-RS may be typically transmitted only within a BW of a respective PDCCH or PDSCH and a UE may use the DM-RS to demodulate data or control information.

Figure 4A:
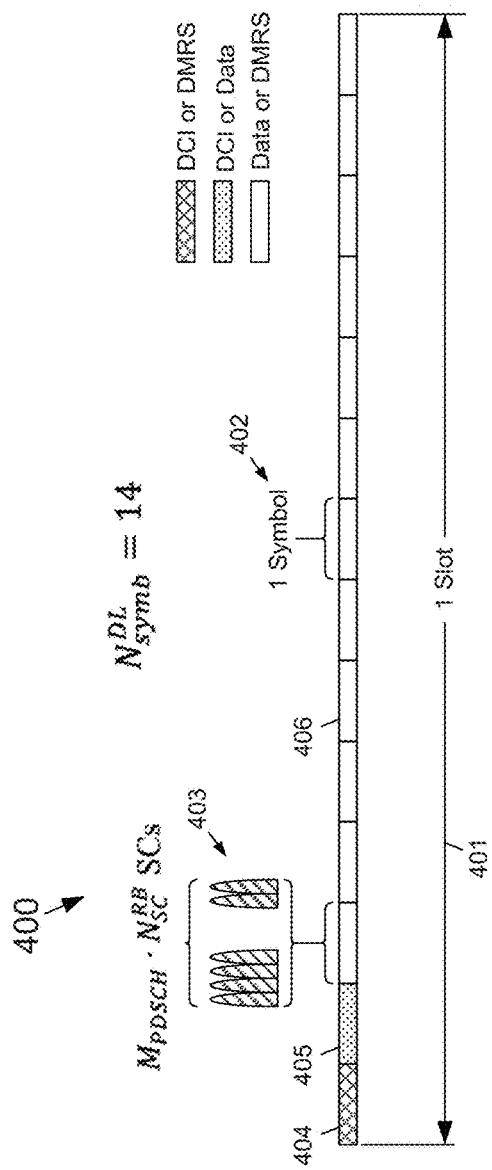
FIG. 4A depicts an example embodiment of a downlink slot structure.
Figure 4B:
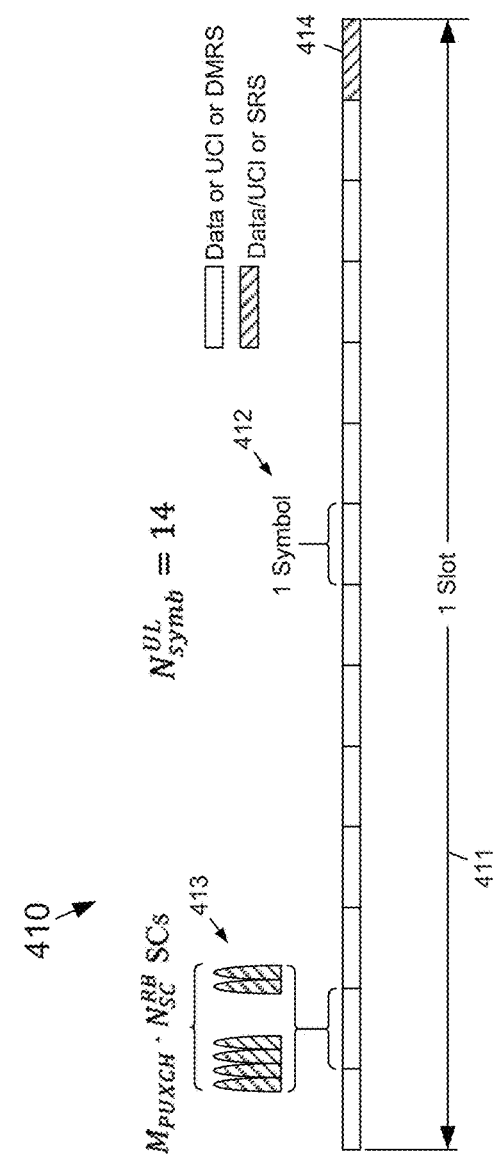
FIG. 4B depicts an example embodiment of an uplink slot structure for physical uplink shared channel transmission or physical uplink control channel transmission.

FIG. 4A depicts an example embodiment of a DL slot structure 400 according to the subject matter disclosed herein. The example embodiment of the DL slot structure 400 depicted in FIG. 4A is for illustration only. FIG. 4 (e.g., FIG. 4A and/or FIG. 4B) does not limit the scope of the subject matter disclosed herein to any particular implementation. It should be noted that in the DL slot structure 400 described as follows, the DCI information need not be located as depicted in FIG. 4A and may be located elsewhere as appropriate.

As depicted in FIG. 4A, a DL slot 401 may include $N_{symb}^{DL}$ symbols 402 in which a gNB may transmit, for example, data information, DCI, or DM-RS. A DL system BW may include $N_{RB}^{DL}$ RBs. Each RB may include $N_{SC}^{RB}$ SCs. A UE may be assigned $M_{PDSCH}$ RBs for a total of $M_{SC}^{PDSCH}=M_{PDSCH}\cdot N_{SC}^{RB}$ SCs 403 for a PDSCH transmission BW. A PDCCH conveying DCI may be transmitted over control channel elements (CCEs) that are substantially spread across the DL system BW. A first slot symbol 404 may be used by the gNB to transmit PDCCH. A second slot symbol 405 may be used by the gNB to transmit PDCCH or PDSCH. Remaining slot symbols 406 may be used by the gNB to transmit PDSCH and CSI-RS. In some slots, the gNB may also transmit synchronization signals and channels that convey system information, such as synchronization signals and primary broadcast channel (SS/PBCH) blocks.

UL signals may also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE may transmit data information or UCI through a respective physical UL shared channel (PUSCH) or a physical UL control channel (PUCCH). A PUSCH or a PUCCH may be transmitted over a variable number of symbols in a slot including one symbol. When a UE simultaneously transmits data information and UCI, the UE may multiplex both in a PUSCH.

A UCI may include hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in the buffer to the UE, and CSI reports enabling a gNB to select appropriate parameters for PDSCH or PDCCH transmissions to a UE.

A CSI report from a UE may include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, a CSI-RS resource indicator (CRI) indicating a CSI-RS resource associated with the CSI report, and a rank indicator (RI) indicating a transmission rank for a PDSCH.

A UL RS may include DM-RS and SRS. A DM-RS may typically be transmitted only within a BW of a respective PUSCH or PUCCH transmission. A gNB may use a DM-RS to demodulate information in a respective PUSCH or PUCCH. A SRS may transmitted by a UE to provide a gNB with an UL CSI and, for a TDD system, an SRS transmission can also provide a PMI for DL transmission. Additionally, in order to establish synchronization or an initial higher-layer connection with a gNB, a UE may transmit a physical random access channel (PRACH).

FIG. 4B depicts an example embodiment of a UL slot structure 410 for PUSCH transmission or PUCCH transmission according to the subject matter disclosed herein. The embodiment of the UL slot structure 410 depicted in FIG. 4B is for illustration only. FIG. 4B does not limit the scope of the subject matter disclosed herein to any particular implementation. It should be noted that in the UL slot structure 410 described as follows, the UCI information need not be located as depicted in FIG. 4B and may be located elsewhere as appropriate.

As depicted in FIG. 4B, a slot 411 may include $N_{symb}^{UL}$ symbols 412 in which a UE transmits, for example, data information, UCI, or DM-RS. An UL system BW may include N RBs. Each RB may include $N_{SC}^{RBSC}$. A UE may be assigned $M_{PUXCH}$ RBs for a total of $M_{SC}^{PUXCH}=M_{PUXCH}\cdot N_{SC}^{RB}$ SCs 413 for a PUSCH transmission BW ("X"="S") or for a PUCCH transmission BW ("X"="C"). The last one or more symbols of a slot may be used, for example, to multiplex SRS transmissions 414 or short PUCCH transmissions from one or more UEs.

Figure 5A:
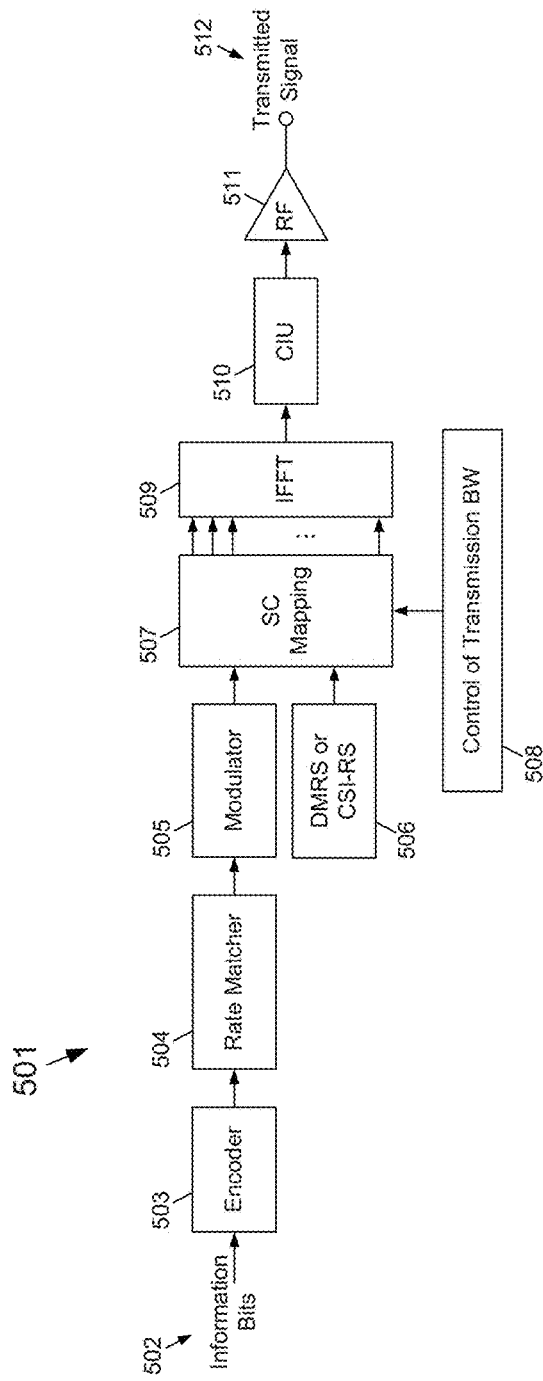
FIG. 5A depicts a block diagram of an example embodiment of a transmitter structure using OFDM according to the subject matter disclosed herein.

FIG. 5A depicts a block diagram of an example embodiment of a transmitter structure 501 using OFDM according to the subject matter disclosed herein. The embodiment of the transmitter structure 501 depicted in FIG. 5A is for illustration only and an actual implementation may have the same or a similar configuration. FIG. 5A does not limit the scope of the subject matter disclosed herein to any particular implementation.

As depicted in FIG. 5A, information bits, such as DCI bits or data information bits 502, may be encoded by an encoder module 503, rate matched to assigned time/frequency resources by a rate matcher module 504 and modulated by a modulator module 505. Subsequently, modulated encoded symbols and DM-RS or CSI-RS module 506 may be mapped to SCs by an SC mapping module 507 controlled by a transmission bandwidth module 508. An inverse fast Fourier transform (IFFT) may be performed by a filter module 509. A cyclic prefix (CP) may be added to the output of the filter module 509. The resulting signal may be filtered by common interface unit (CIU) filter module 510 and transmitted by an RF module 511 as a transmitted signal 512.

Figure 5B:
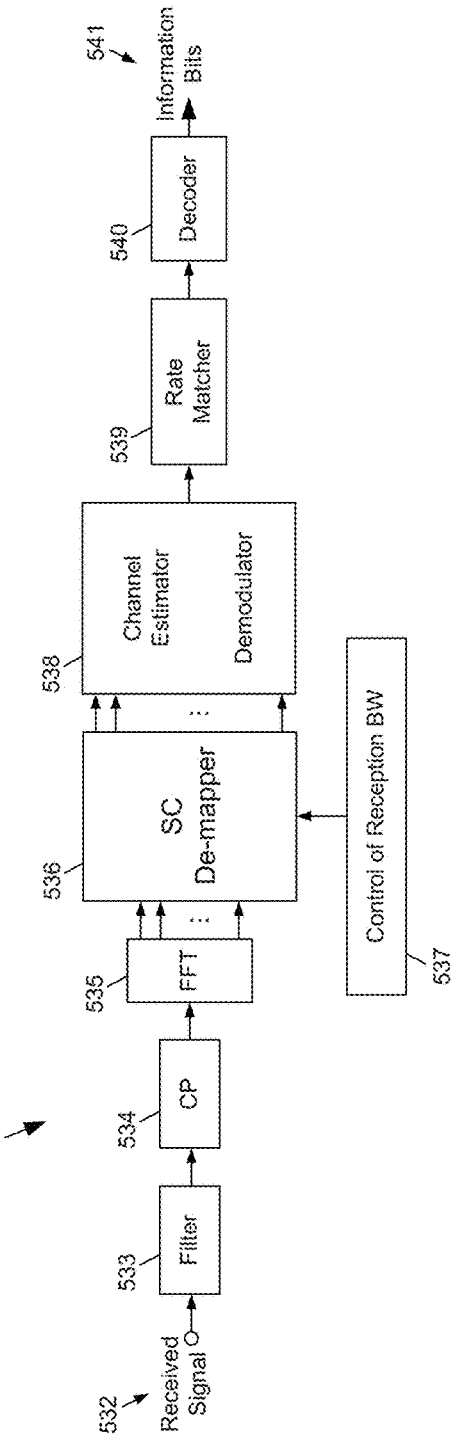
FIG. 5B depicts a block diagram of an example embodiment of an OFDM receiver structure according to the subject matter disclosed herein.

FIG. 5B depicts a block diagram of an example embodiment of an OFDM receiver structure 531 according to the subject matter disclosed herein. The embodiment of the receiver structure 531 depicted in FIG. 5B is for illustration only and an actual implementation may have the same or a similar configuration. FIG. 5B does not limit the scope of the subject matter disclosed herein to any particular implementation. As depicted in FIG. 5B, a received signal 532 may be filtered by a filter module 533. A CP removal module 534 may remove a cyclic prefix. A filter module 535 may apply a fast Fourier transform (FFT). An SC de-mapping module 536 may de-map SCs selected by BW selector module 537. Received symbols may be demodulated by a channel estimator and a demodulator module 538. A rate de-matcher module 539 may restore a rate matching, and a decoder module 540 may decode the resulting bits to provide data information bits 541. DL transmissions and UL transmissions may be based on an orthogonal frequency division multiplexing (OFDM) waveform that includes a variant using a DFT preceding that is known as DFT-spread-OFDM.

As previously mentioned, an objective in the 3GPP Rel-17 SID on RedCap NR devices is to support the same set of use cases in FR2 as in case of FR1. Beam refinement may be a key feature for FR2 operation in NR. An important issue relates to enabling a beam refinement procedure for RedCap UEs that are in a RRC_INACTIVE state (also referred to herein as a RRC Inactive state or an inactive mode). Accordingly, the subject matter disclosed herein provides a set of beam refinement procedures to enable RedCap in an inactive mode transmission in FR2.

Figure 6A:
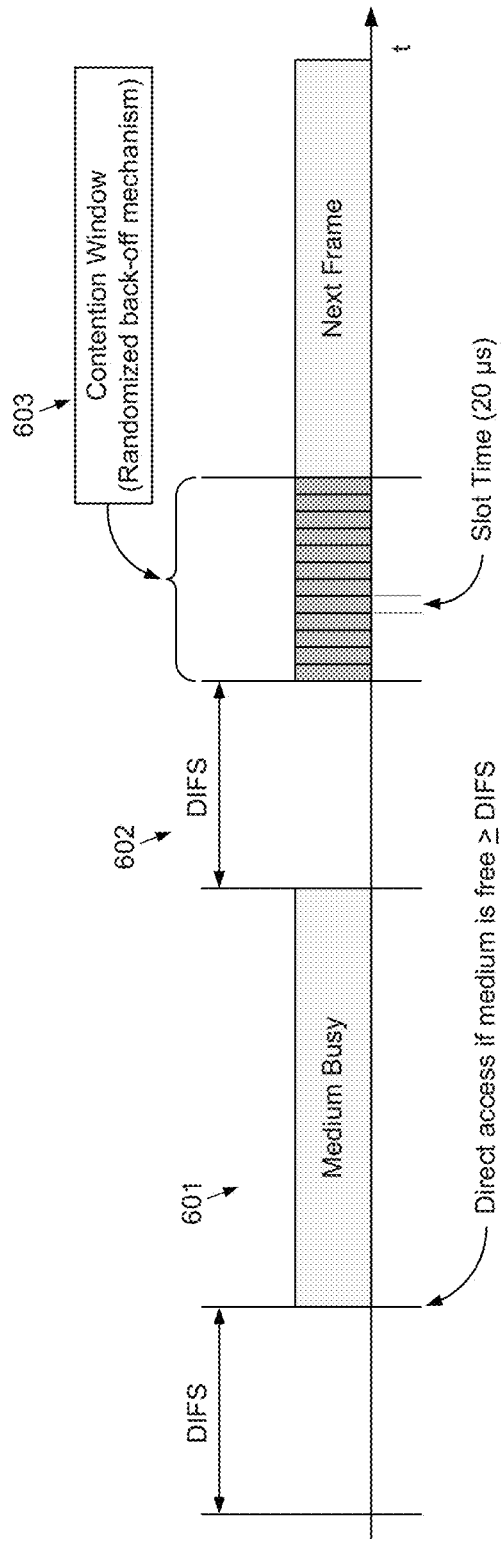
FIGS. 6A and 6B depict a traditional WiFi channel access process that is based on an omnidirectional LBT process.
Figure 6B:
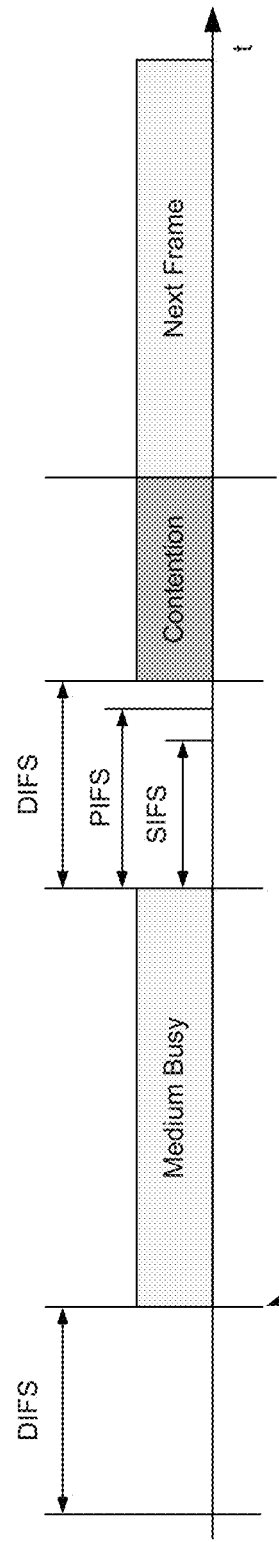

FIGS. 6A and 6B depict a traditional WiFi channel access process 600 that is based on an omnidirectional LBT process. A station that is ready to send starts sensing the medium using a Carrier Sense that is based on a Clear Channel Assessment (CCA). As used herein, the term "medium" may refer to, for example, one or more electromagnetic frequency ranges that may or may not be contiguous. Additionally, medium, as used herein, may also refer to a shared electromagnetic frequency spectrum that may be shared between different network operators, whether the spectrum is a licensed or unlicensed spectrum. If the medium is free for a duration of an Inter-Frame Space (IFS), which depends on the service type, the station may start sending. FIG. 6B depicts different relative durations for Inter-Frame Spaces provided by the IEEE 802.11n standard. A Reduced IFS (RIFS) having a corresponding reduced overhead is provided for a higher throughput only if no Short IRS (SIFS) is expected. In contrast, the IEEE-802.11ad standard provides no RIFS. The 801.11n RIFS has a duration of 2 μs, which is the shortest of the IFSs. A SIFS is used for an acknowledgement (ACK) message, a clear to send (CTS) message, and a polling response (3 us for 802.11ad). A Point coordination function (PCF) IFS (PIFS) is used for a time-bounded service using a PCF. A distributed coordination function (DCF) IFS (DIFS) is used for normal asynchronous data service (5 us for 802.11ad). An Arbitration IFS (AIFS) (not shown) is used prioritizing on access category over another and is variable depending on QoS. An extended IFS (EIFS) (not shown) is used after an incorrect frame check sequence (FCS).

If, as depicted at 601 in FIG. 6A, the medium is determined by a CCA process to be busy, at 602 the station waits a duration of a free IFS (DIFS) plus an additional random back-off time at 603 (which may include multiple time slots) for collision avoidance.

Figure 7:
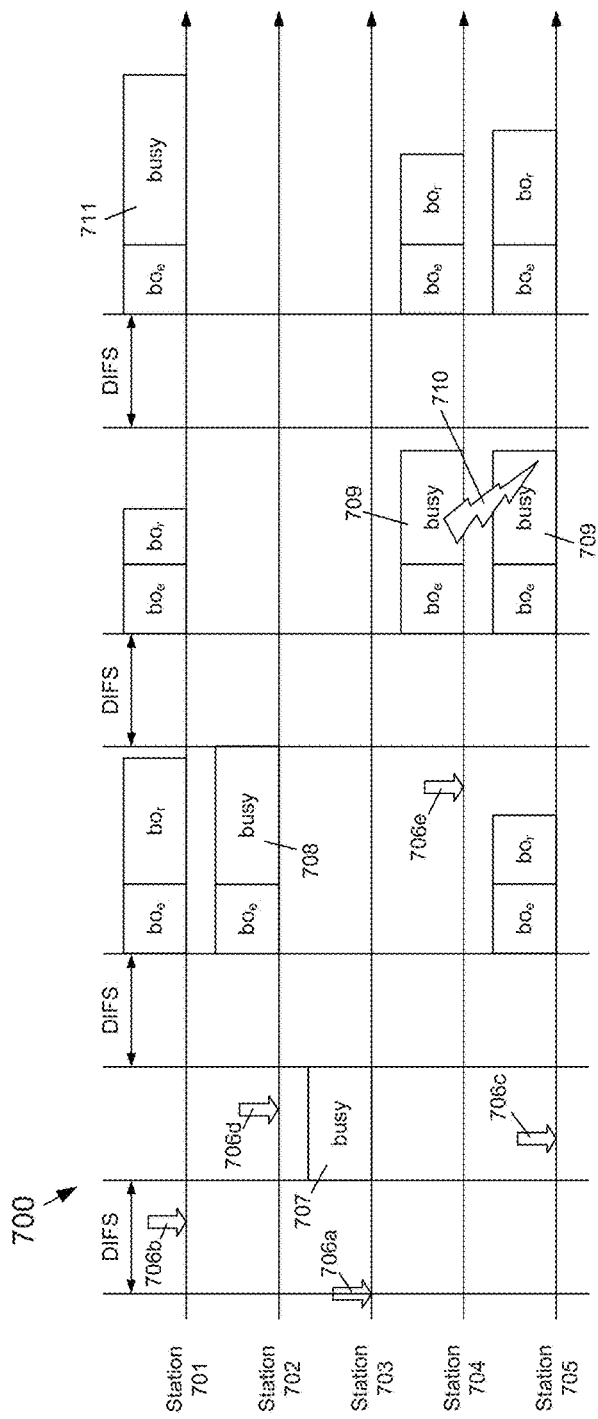
FIG. 7 depicts an example legacy WiFi channel access process for five example stations 701-705.

FIG. 7 depicts an example legacy WiFi channel access process 700 for example five stations 701-705. Time advances toward the right in FIG. 7 and the downward arrows 706 represent a packet for transmission that arrives at a station medium access control (MAC) layer of a station. As depicted in FIG. 7, a packet 706a arrives at the MAC layer of station 703 first in time and after a LBT process is transmitted at 707 in a transmit block because the medium was idle. Three packets 706b, 706c and 706d for transmission respectively arrive at stations 701, 705 and 702. Using the LBT process, station 702 gains access to the medium at 708 after a DIFS and a back-off time period $bo_e$ elapse, and transmits the data packet. The overall back-off time periods for stations 701 and 705 include a residual back-off time $bo_r$. The back-off timer resumes after another free IFS. Another packet 706e for transmission arrives at station 704. As indicated by FIG. 7, both stations 704 and 705 transmit their respective packets at 709, but both packets collide at 710. After the next free IFS, station 701 gains access to the medium and transmits the data packet.

Figure 8:
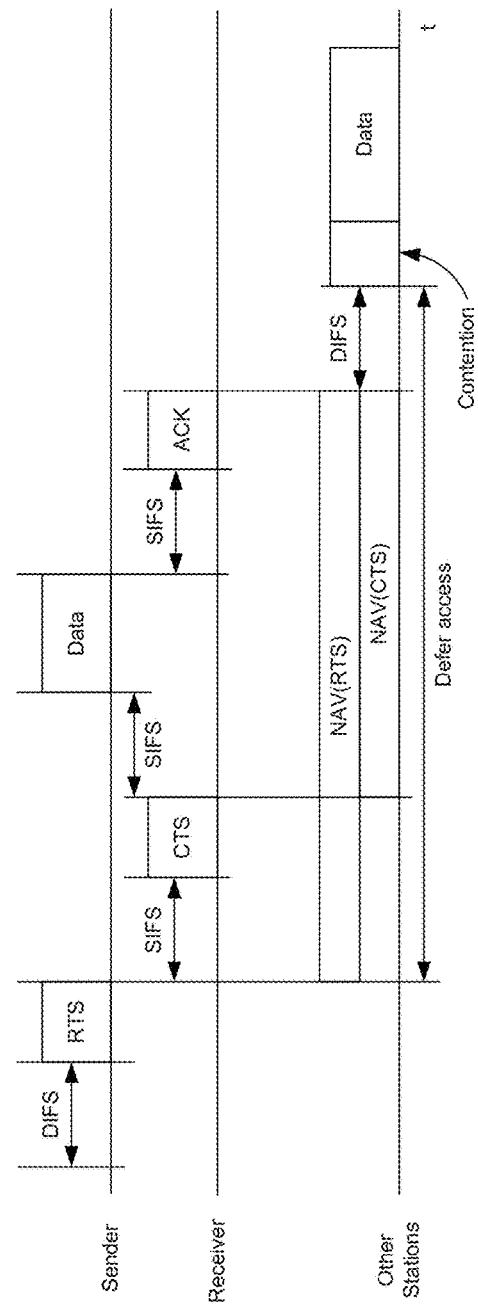
FIG. 8 depicts a traditional 802.11 channel access process for a distributed coordination function with Request to Send and Clear to Send that is based on an omnidirectional LBT process.

FIG. 8 depicts a traditional 802.11 channel access process 800 for a DCF with Request to Send (RTS) and Clear to Send (CTS) that is based on an omnidirectional LBT process. In FIG. 8, a sending station 801 sends unicast packets to a receiving station 802. The sending station 801 may send a RTS message with a reservation parameter after waiting for DIFS period of time. The RTS message indicates the amount of time the data packet that will be sent by the sending station 801 needs the medium. If the receiving station 802 is ready to receive, the receiver sends a CTS message after a SIFS period of time. The sending station 801 sends the data after a SIFS period time, and the receiving station sends an acknowledgement via an ACK message. Other stations store medium reservations (Network Allocation Vector (NAV) i.e., virtual sensing) that are distributed using RTS and CTS messages.

FIG. 9 depicts the four legacy categories of LBT for a single channel For NR-U channel access in the $3^{rd}$ Generation Partnership Project (3GPP). A Category 1 LBT (CAT 1 LBT) is for an immediate transmission after a short switching gap of 16 μs. A Category 2 LBT (CAT 2 LBT) is for a LBT without a random time period back-off, in which the CCA period is deterministic (e.g., fixed to 25 μs). A Category 3 LBT (CAT 3 LBT) is for a LBT having a random back-off time period with a contention window of a fixed size, in which an extended CCA period based on a random time period within a fixed contention window. A Category 4 LBT (CAT 4 LBT) is for a LBT using a random back-off with a contention window of variable size, in which an extended CCA period is based on a random time period within a contention window having a size that may vary based on channel dynamics.

For NR-U multi-channel LBT, there are two types of LBT, Type A and Type B. For a Type B LBT, which is a WiFi-like technique, a gNB randomly selects one primary carrier for a CAT 4 LBT and the gNB performs a CAT 2 25 μs LBT on other carriers immediately before a transmission occurs on the primary carrier. A simultaneous transmission may occur if the primary carrier passes a CAT 4 LBT and other carriers pass CAT 2 LBT immediately before the transmission. Thus, there is no sequential nature for a Type B LBT.

For a Type A LBT, a gNB performs a CAT 4 LBT on each of the intended carriers with certain constraints on back-off countdown for fairness. Although the CAT 4 LBT cannot guarantee simultaneous transmission, an independent CAT 4 LBT is much more aggressive than a Type B LBT in terms of occupancy of channels. The reason is that a CAT 4 LBT includes a "channel competing" nature, which a CAT 2 LBT does not include. For example, in busy channels, a Type B LBT might fall back to single carrier, but a Type A LBT may obtain the channels sequentially, which is a reason why the back-off countdown in a Type A LBT includes constraints.

In contrast to legacy omnidirectional LBT processes used by IEEE WiGi and NR-U Release 16, the subject matter disclosed herein provides a channel access procedure for a (directional) multi-beam LBT for NR-U at 60 GHz. FIGS. 10A and 10B respectively depict a legacy omnidirectional LBT process and a directional LBT process according to the subject matter disclosed herein. In FIG. 10A, during an LBT portion 1001 of a legacy channel access, a TPR performs an omnidirectional LBT process 1002 before accessing the medium for a transmission 1003. In contrast, in FIG. 10B during an LBT portion 1011 of a channel access according to the subject matter disclosed herein, a TPR performs a directional LBT process 1012 that is independent in each direction before accessing the medium for a transmission 1013. Operation from 52.6 GHz to 71 GHz is highly directional, so antenna configurations for both transmission and reception are beamformed according to the targeted direction. Thus, for directional transmission and reception on the 60 GHz unlicensed band is to enable a potential transmitter to perform a LBT according to the same direction as its intended transmit beam direction, referred to herein as a directional LBT, which may lead to better channel access probability and correspondingly better spatial reuse under the same Energy Detection (ED) threshold as an omnidirectional LBT.

As used herein, a multi beam Type I transmission uses multiple layers and multiple data streams between a transmitter Tx and a receiver Rx. Also as used herein, a multi beam Type II transmission is a single layer transmission using multiple beams between a transmitter Tx and a receiver Rx.

Figure 11:
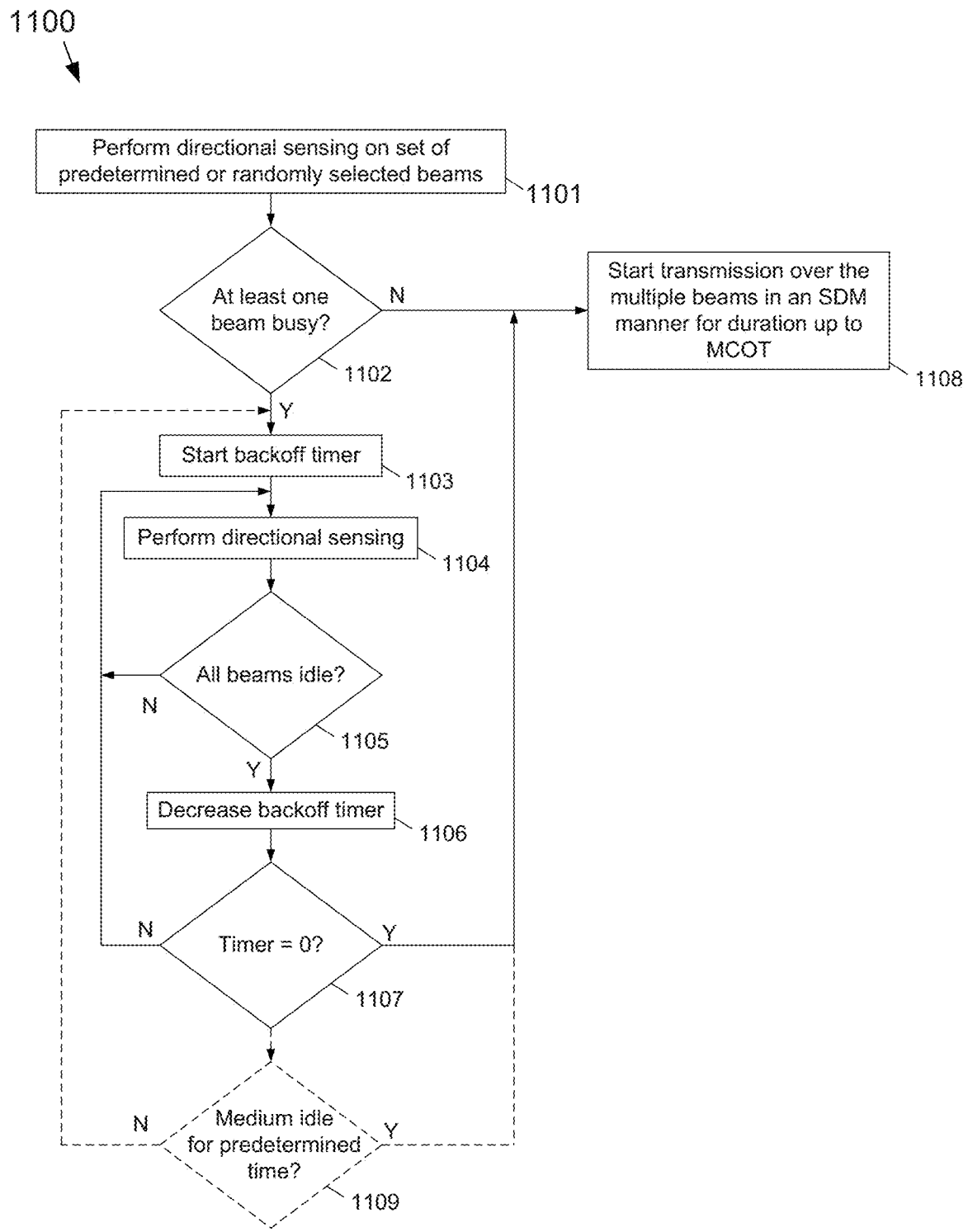
FIG. 11 is a flowchart of a first example embodiment of a method of a channel access procedure for a multi-beam LBT using a single back-off timer for NR-U at 60 GHz according to the subject matter disclosed herein.

FIG. 11 is a flowchart of a first example embodiment of a method 1100 of a channel access procedure for a multi-beam LBT using a single back-off timer for NR-U at 60 GHZ according to the subject matter disclosed herein. An example environment for the method 1100 involves multiple beams between a single TRP and a UE, similar to the environment depicted in FIG. 1 herein. A transmitter in the present example environment may be, for example, embodied as a base station (or gNB) or as a UE, such as depicted in FIGS. 2 and 3 herein. Additionally, the TX processing chains depicted in at least FIGS. 2 and 3 herein may be configured to perform the first embodiment of a channel access procedure for a multi-beam LBT according to the subject matter disclosed herein.

At 1101, a transmitter makes a directional sensing CCA on a set of predetermined or randomly selected beams (or directions), either sequentially in a set of time slots or simultaneously in one time slot, depending on the capability of the transmitter. The medium in a specific direction may be sensed by comparing a detected energy level in that specific direction to a predetermined threshold value for that specific direction. The medium is busy if the detected energy level is greater than the threshold, otherwise medium is idle.

At 1102, it is determined whether at least one beam (or direction) is busy. If no beams are sensed as being busy (i.e., all beams idle), flow continues to 1108. If, at 1102, if at least one beam is sensed as busy, flow continues to 1103 where the transmitter starts a single back-off timer that has been initialized with a randomly selected value between 0 and CW (contention window). The value of CW may be specific to each direction or beam.

Flow continues to 1104, where the transmitter continues making directional sensing on the set of predetermined (or randomly selected) beams by performing a clear channel assessment (CCA) in every slot time. At 1105, it is determined whether at least one beam is sensed as idle. If not, flow returns to 1104, and the back-off timer remains at its current value. If, at 1105, it is determined that all beams are idle, flow continues to 1106 where the back-off timer is decreased by a predetermined amount. At 1107, it is determined whether the back-off timer equals 0. If not, flow returns to 1104.

When the back-off timer reaches zero at 1107, the flow continues to 1108 the transmitter may start multi-beam transmissions and/or reception in an SDM manner in the set of directions or beams simultaneously in an SDM manner using multi-beam Type I transmission for a duration of a maximum channel occupancy time (MCOT). Optionally, when the back-off timer reaches zero at 1107, the flow continues to 1109 where it is determined whether the set of directional beams has been sensed idle for another fixed duration (beyond the duration of the back-off timer). If so, the flow continues to 1108 where the transmitter may start multi-beam transmissions and/or reception in an SDM manner in the set of directions or beams simultaneously in an SDM manner using multi-beam Type I transmission for a duration of a maximum channel occupancy time (MCOT). If not, flow returns to 1103 where the back-off timer is restarted. Before the back-off timer (and optional timer) reaches zero, a multi-beam transmission is not allowed, but a single beam transmission may be used pursuant to legacy channel access procedures in Release 16 NR-U (3GPP Release 16 NR-U channel access procedure). During the MCOT, if there is a transmission gap between two successive transmissions that is greater than a predetermine threshold, the transmitter/receiver may optionally make a CCA sensing in all the directions for one or several time slots before starting the next transmission. If at least one direction is sensed as busy, the transmission cannot start and will repeat the same CCA in a future COT.

A contention adjustment for simultaneous multi-beam transmissions that include PDSCH and PUSCH may be provided as follows. If a new HARQ (Hybrid Automatic Repeat request) feedback from the simultaneous multi-beam transmissions is available relative to a prior CW update, the feedback for the latest COT for which new feedback is received may be used. A HARQ feedback may include any implicit methods of HARQ feedback determination. If the HARQ feedback is a ACK message, the contention window CW may be set to $CW_{min}$ for each of the beams/TCI (Transmission Configuration Indicator) states. If the HARQ feedback is a NACK message, the contention window CW for each of the beams/TCI state may be set to min($CW \times 2+1$, $CW_{max}$). If there is an absence of feedback within a window (as defined as follows), the gNB or the UE retransmits the transmit block, the contention window CW for each of the beams/TCI state may be set to min($CW \times 2+1$, $CW_{max}$). If there is an absence of feedback, a window starts at the end of a reference duration and has a duration of max (X ms, the duration of the transmission burst from start of the reference duration+1 ms). Otherwise, if new HARQ feedback is not available, CW may remain the same.

A reference duration corresponding to a channel occupancy initiated by the gNB sending PDSCH(s) may be defined as a duration starting from the beginning of the channel occupancy until the end of the first slot in which at least one unicast PDSCH is transmitted over all the resources allocated for the PDSCH for each beam/TCI state, or until the end of the first transmission burst by the gNB that contains a unicast PDSCH(s) transmitted over all the resources allocated for the PDSCH for each beam/TCI state, whichever occurs earlier. If channel occupancy includes a unicast PDSCH, but does not include any unicast PDSCH transmitted over all the resources allocated for that PDSCH for each beam/TCI state, then the duration of the first transmission burst by the gNB within the channel occupancy that contains unicast PDSCH(s) may be the reference duration for CWS adjustment.

Figure 12:
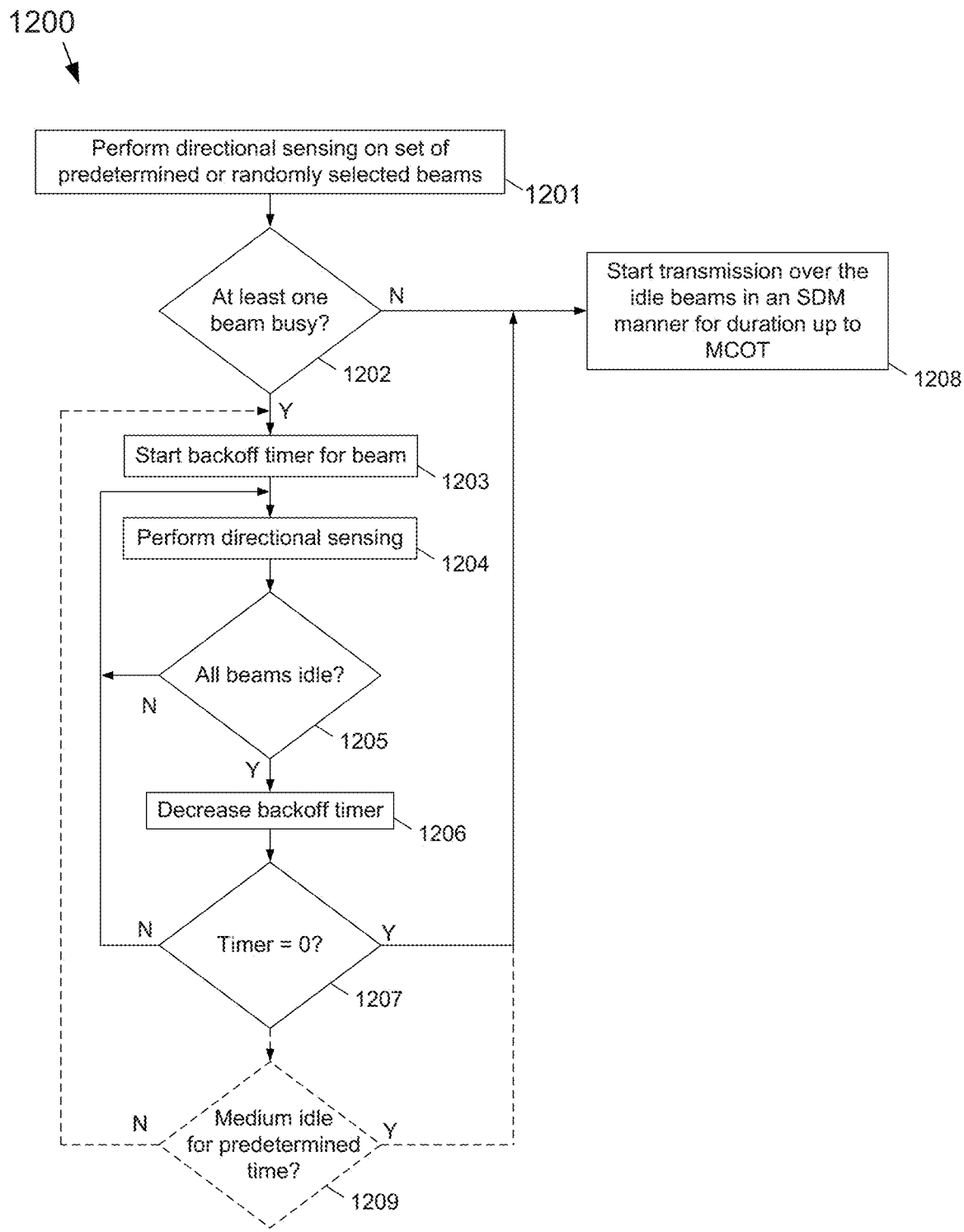
FIG. 12 is a flowchart of a second example embodiment of a method of a channel access procedure for a multi-beam LBT using multiple back-off timers for NR-U at 60 GHz according to the subject matter disclosed herein.

FIG. 12 is a flowchart of a second example embodiment of a method 1200 of a channel access procedure for a multi-beam LBT using multiple back-off timers for NR-U at 60 GHz according to the subject matter disclosed herein. An example environment for the method 1200 involves multiple beams between a single TRP and a UE, similar to the environment depicted in FIG. 1 herein. A transmitter in the present example environment may be, for example, embodied as a base station (or gNB) or as a UE, such as depicted in FIGS. 2 and 3 herein. Additionally, the TX processing chains depicted in at least FIGS. 2 and 3 herein may be configured to perform the second embodiment of a channel access procedure for a multi-beam LBT according to the subject matter disclosed herein.

At 1201, a transmitter, whether at the TRP or at the UE, makes a directional sensing CCA on a set of pre-determined or randomly selected beams (or directions), either sequentially in a set of time slots or simultaneously in one time slot, depending on the capability of the transmitter. The medium in a specific direction may be sensed by comparing a detected energy level in that specific direction to a predetermined threshold value for that specific direction. The medium is busy if the detected energy level is greater than the threshold, otherwise medium is idle.

At 1202, it is determined whether at least one beam (or direction) is busy. If at least one beam is sensed as busy, flow continues to 1203 where the transmitter starts a back-off timer corresponding to each beam sensed as busy. Each back-off timer may be initialized with a randomly selected value between 0 and CW (contention window). The value of CW may be specific to each direction or beam.

At 1204, the transmitter continues making directional sensing on each beam determined to be busy by performing a clear channel assessment (CCA) in every slot time. At 1205, it is determined whether each beam is sensed as idle. If not, flow returns to 1204 and the back-off timer for that beam remains at its current value. If, at 1205, it is determined that a beam is idle, flow continues for that beam to 1206 where the back-off timer for that beam is decreased by a predetermined amount. At 1207, it is determined whether the back-off timer equals 0. If not, flow returns to 1204.

When the back-off timer reaches zero at 1207, the flow continues to 1208 the transmitter may start multi-beam transmissions and/or reception in an SDM manner over a beam sensed idle using a multi-beam Type I transmission for a duration of a maximum channel occupancy time (MCOT). Optionally, when the back-off timer reaches zero at 1207, the flow continues to 1209 where it is determined whether a beam has been sensed idle for a fixed duration. If so, flow continues to 1208 the transmitter may start a transmission or a reception in an SDM manner over a beam sensed idle using a multi-beam Type I transmission for a duration of MCOT. If not, flow returns to 1203 where the back-off timer for the beam is restarted. It should be noted that before each back-off timer (and optional timer) reaches 0, multi-beam transmission is not allowed, but a single beam transmission may be performed on a beam having a back-off timer that reaches 0 using legacy channel access procedures in Release 16 NR-U.

If, at 1202, for the beams determined to be idle, flow continues to 1208 where the transmitter starts transmission over the multiple beams simultaneously using a multi-beam Type I transmission for a duration of MCOT. For a half-duplex transmitter, the back-off timers corresponding to the beams sensed as busy are held fixed until the transmissions have completed for the beams sensed to be idle. After the transmission have completed for the beams sensed to be idle, each of the beams sensed to be busy decrement the back-off timer by one when the medium is sensed idle for that specific beam. For a full-duplex transmitter, each of the back-off timers for the beams sensed to be busy is decremented whenever the medium is sensed idle for that particular beam.

Optionally, during the MCOT, for a transmission gap between two successive transmissions) greater than a threshold, the transmitter/receiver makes a CCA sensing of a predetermined set of directions, which is determined before acquiring the MCOT, for one or several time slots before starting the next transmission. If only a subset of directions is sensed to be idle, the transmission starts after CCA sensing is performed the subset of beams. When an individual back-off timer corresponding to a beam reaches zero and the set of directional beams has been sensed idle for a fixed duration, the transmitter may start multi-beam transmissions simultaneously using those specific beams via beam Type I transmission.

A contention adjustment for simultaneous multi-beam transmissions that include PDSCH and PUSCH may be as follows. If new HARQ feedback from the previous simultaneous multi-beam transmissions of a given set of TCI states is available relative to the prior CW update of the set of TCI states, the feedback for the latest COT of this set of TCI states for which new feedback is received may be used. If the HARQ feedback is an ACK message, the contention window CW may be set to $CW_{min}$ for each of the beams/TCI states in the set. If the HARQ feedback is a NACK message or if there is an absence of feedback within a window (as defined as follows), the gNB or the UE retransmits the transmit block and the contention window CW for each of the beams/TCI state in this set may be set to min($CW \times 2+1$, $CW_{max}$). The window starts at the end of the reference duration and may have a duration of max(X ms, the duration of the transmission burst from start of the reference duration+1 ms). Otherwise, if a new HARQ feedback is not available for this set of TCI states, the contention window CW may remain the same for each of the beams/TCI states in the set. Note that a HARQ feedback may include any implicit methods of HARQ feedback determination.

The reference duration corresponding to a channel occupancy initiated by the gNB sending PDSCH(s) may be defined for this embodiment as a duration starting from the beginning of the channel occupancy until the end of the first slot in which at least one unicast PDSCH is transmitted over all the resources allocated for the PDSCH for each beam/TCI state in the set of TCI states that perform simultaneous multi-beam transmissions, or until the end of the first transmission burst by the gNB that contains unicast PDSCH(s) transmitted over all the resources allocated for the PDSCH for each beam/TCI state in the set of TCI states that perform simultaneous multi-beam transmissions, whichever occurs earlier. If the channel occupancy includes a unicast PDSCH, but does not include any unicast PDSCH transmitted over all the resources allocated for that PDSCH for each beam/TCI state in the set of TCI states that perform simultaneous multi-beam transmissions, then the duration of the first transmission burst by the gNB within the channel occupancy that contains unicast PDSCH(s) may be the reference duration for CWS adjustment for the set of the set of TCI states that perform simultaneous multi-beam transmissions.

Figure 13:
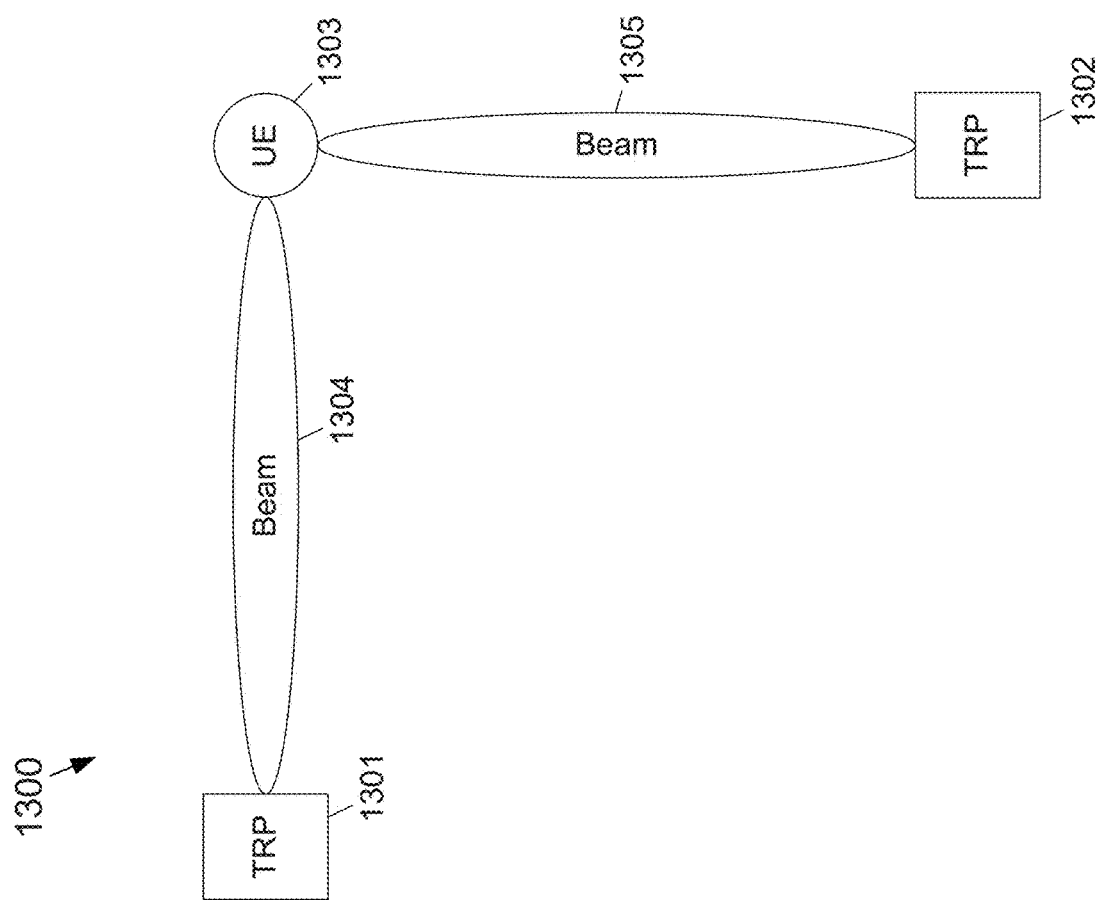
FIG. 13 depicts an environment for a third example embodiment of a channel access process for a multi-beam LBT for NR-U at 60 GHz according to the subject matter disclosed herein.

FIG. 13 depicts an environment for a third example embodiment of a channel access process 1300 for a multi-beam LBT for NR-U at 60 GHz according to the subject matter disclosed herein. An example environment for FIG. 13 may include multiple active beam pairs between multiple TRPs and a UE, similar to the environment depicted in FIG. 1 herein. A transmitter in the present example environment may be, for example, embodied as a base station (or gNB) or as a UE, such as depicted in FIGS. 2 and 3 herein. Additionally, the TX processing chains depicted in at least FIGS. 2 and 3 herein may be configured to perform the third embodiment of a channel access procedure for a multi-beam LBT according to the subject matter disclosed herein.

FIG. 13 depicts a first TRP 1301, a second TRP 1302, a UE 1303, a first beam 1403 and a second beam 1305. After a beam management procedure, the UE 1303 is able to simultaneously receive data the first beam 1403 from the TRP 1301 and the second beam 1305 from the TRP 1302, but is only be able to transmit via one beam to either TRP 1301 or TRP 1302. For this example environment, a non-ideal backhaul is assumed between TRP 1301 and TRP 1302. Accordingly, the UE 1303 receives two separate transmissions from TRP1 and TRP2 with different Physical Downlink Control Channel (PDCCH) Downlink Control Information (DCIs) and a different Physical Data Shared Channel (PDSCH).

As a first option for downlink channel access, one of the TRPs 1301, 1302 performs directional sensing CCA with a back-off timer on only one beam, referred to as the primary beam. The primary beam may be predetermined or determined as a dynamic selection, for example, the beam over which a LBT is first completed. The back-off timer may be randomly selected between interval (0, CW) in which CW may be specific to the primary beam. After the directional sensing CCA with back-off timer has been successful in primary beam, other TRPs (some of which are not shown) may perform a directional sensing CCA for one or multiple time slots on beams other than the primary beam simultaneously or sequentially depending on the transmitter capability. The TRPs may be allowed to transmit DL data burst(s) on the beams sensed to be idle.

As a second option for downlink channel access, each TRP 1301, 1302 performs directional sensing CCA using a back-off timer on its one direction/beam. The back-off timer may be randomly selected between an interval (0, CW) in which CW may be specific to that beam. A TRP 1301, 1302 may be allowed to transmit DL data burst(s) on beams that have completed directional sensing CCA using a back-off timer and with potential self-deferral (including idle sensing for a single interval) to align transmission over multiple beams. In particular, when one TRP ceases transmission on any one beam, for the other beams, the other TRPs may resume decrementing the back-off timer when idle sensing slots have been detected either after waiting for a fixed duration, or after reinitializing the back-off timer.

For an uplink channel access, the UE 1303 may perform an independent directional sensing CCA using a back-off timer on a set of UL beams/directions. The UE 1303 always transmits on a first available beam. For example, the UE may hop between beams depending on which beam is available first. A transmitter performs directional sensing CCA using a back-off timer on only one beam, again referred to a primary beam. The primary beam may be a predetermined selection and may be determined by a dynamic selection, such as the beam that first completed a LBT procedure. The back-off timer may be initialized by a randomly selected value between interval (0,CW) in which CW is specific to the primary beam.

After the directional sensing CCA using a back-off timer is successful in primary beam, the transmitter may perform directional sensing CCA for one or multiple time slots on the other beams simultaneously or sequentially depending on the transmitter capability. If the medium is sensed busy after CCA for one of the other nonprimary beams, the transmitter may immediately continue to make CCA in the next time slot without any back-off, unlike the CCA mechanism of the primary beam. The transmitter is allowed to transmit DL data burst(s) on the beams sensed idle according.

Optionally, when a back-off timer completes, a transmitter (TRP or EU) may determine whether the medium is idle for an additional predetermined period of time before starting a transmission. If the medium is sensed as busy during the additional predetermined period of time, the process restarts with initializing a back-off timer.

The fourth example embodiment disclosed herein is an extension of the first embodiment, uses RTS/CTS and a single back-off timer, and involves multiple active beam pairs between TRPs and UE. An example environment for the fourth example embodiment may be similar to the environment depicted in FIG. 1 herein. A transmitter in the present example environment may be, for example, embodied as a base station (or gNB) or as a UE, such as depicted in FIGS. 2 and 3 herein. Additionally, the TX processing chain depicted in at least FIGS. 2 and 3 herein may be configured to perform the fourth embodiment of a channel access procedure for a multi-beam LBT according to the subject matter disclosed herein.

After a beam management procedure, a UE is able to respectively simultaneously transmit and receive data from/ to multiple TRPs via corresponding beams. A backhaul between the TRPs is assumed to be non-ideal backhaul, and the UE receives separate transmissions from the TRPs with different PDCCH DCIs and different PDSCH.

For downlinks, one version of the fourth embodiment provides that a TRP may perform directional sensing CCA using a back-off timer on only one beam, referred to as the primary beam. The primary beam may be determined based on a preselection or may be made as a dynamic selection in which the primary beam is determined as the beam that first completes an LBT process. The back-off timer may be initialized using a randomly selected value from the interval (0, CW) in which CW may be specific to the primary beam. After directional sensing CCA with back-off timer has been successful in the primary beam, other TRPs may perform a directional sensing CCA simultaneously or sequentially on one or multiple time slots on the other beams, simultaneously or sequentially depending on the transmitter capability. The TRPs may be allowed to transmit a downlink data burst(s) on the beams sensed to be idle.

Another version of the fourth embodiment provides that for downlinks each TPR may perform directional sensing CCA with back-off timer on one direction/beam. The back-off timer may be initialized using a randomly selected value from the interval (0, CW) in which CW may be specific to that beam. The TRP may transmit a downlink data burst(s) on the beams that have completed directional sensing CCA using a back-off timer and with potential self-deferral (including idle sensing for a single interval) to align transmission over multiple beams. In particular, when a TRP ceases transmission on any one beam, for the other beams, other TRPs may resume decrementing the back-off timer when idle sensing slots have been detected either after waiting for a fixed duration or after reinitializing the back-off timer.

For uplinks, a UE may be considered to the transmitter and may operate the same as a TRP in a downlink, as described above for the fourth embodiment.

Figure 14:
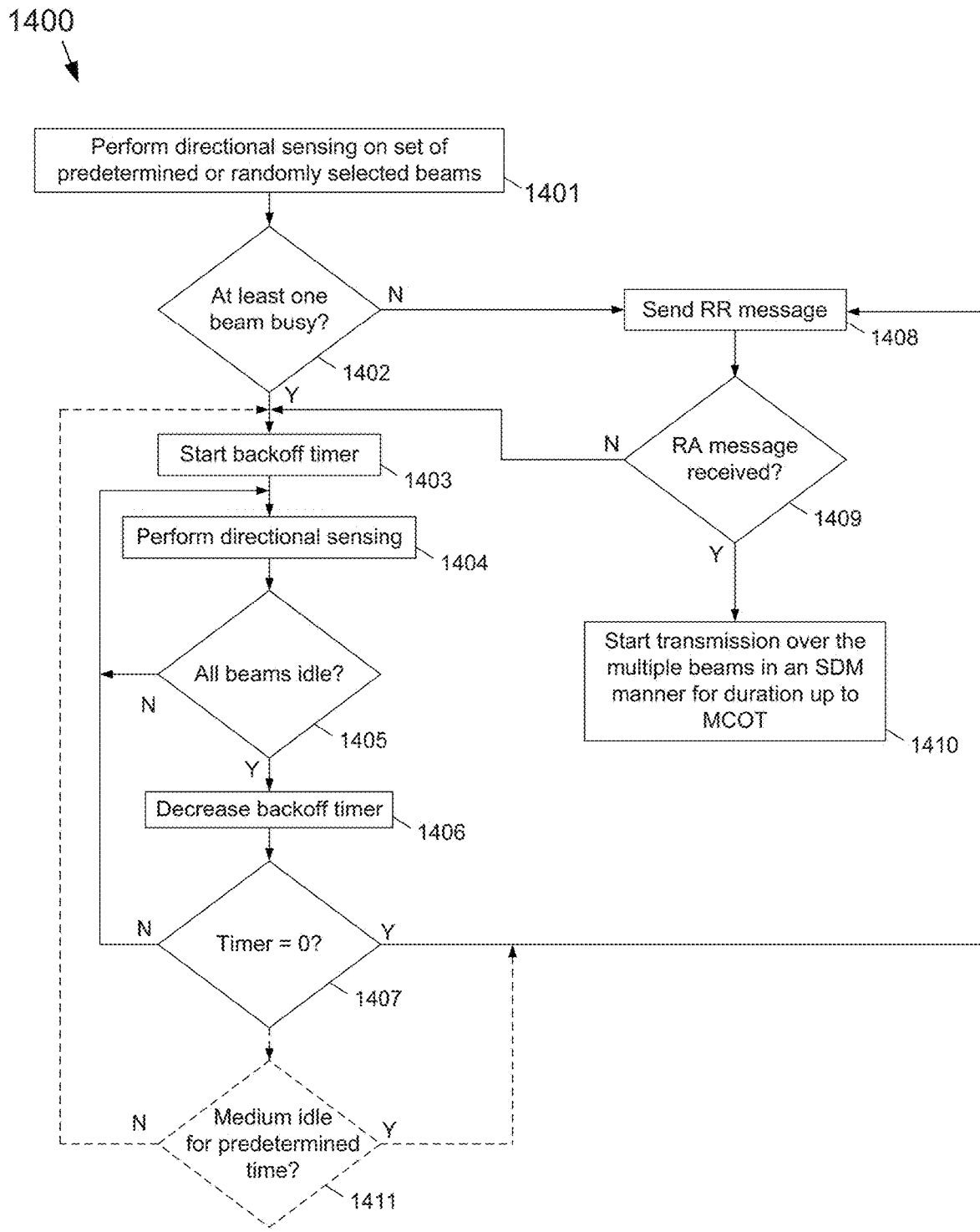
FIG. 14 is a flowchart of an example fourth embodiment of a method of a channel access procedure for a multi-beam LBT using a single back-off timer for NR-U at 60 GHz according to the subject matter disclosed herein.

FIG. 14 is a flowchart of an example fourth embodiment of a method 1400 of a channel access procedure for a multi-beam LBT using a single back-off timer for NR-U at 60 GHZ according to the subject matter disclosed herein. At 1401, transmitter, whether at a TRP or at the UE, makes directional sensing CCA on a set of predetermined or randomly selected beams (or directions), either sequentially in a set of time slots or simultaneously in a time slot depending on the capability of the transmitter. The medium in a specific direction may be sensed by comparing a detected energy level in that specific direction to a predetermined threshold value for that specific direction. The medium in a specific direction may be sensed by comparing a detected energy level in that specific direction to a predetermined threshold value for that specific direction. The medium is busy if the detected energy level is greater than the threshold, otherwise medium is idle.

At 1402, it is determined whether at least one beam (or direction) is busy. If no beams are sensed as being busy (all beams idle), flow continues to 1408. If, at 1402, if at least one beam is sensed as busy, flow continues to 1403 where the transmitter starts a single back-off timer that has been initialized with a randomly selected value between 0 and CW. The value of CW may be specific to each of the multiple beams.

Flow continues to 1404, where the transmitter continues making directional sensing on the set of predetermined (or randomly selected) beams by performing a CCA sensing in every slot time. At 1405, it is determined whether at least one beam has been sensed as idle. If not, flow returns to 1404, and the back-off timer remains at its current value. If, at 1405, it is determined that all beams are idle, flow continues to 1406 where the back-off timer is decreased by a predetermined amount. At 1407, it is determined whether the back-off timer equals 0. If not, flow returns to 1404.

When the back-off timer reaches zero at 1407, and the set of directional beams has been sensed idle for a fixed duration in addition to the duration of the back-off timer, flow continues to 1408 where the transmitter sends a Reservation Request (RR) message either over a single beam or simultaneously over the set of beams using a multi-beam Type II transmission. The RR message may include an identifier of the transmitter, an identifier of the receiver, and an identifier of the beam for the receiver to perform a CCA (e.g., the TCI state or the QCL relation info of the beam). After the RR message has been received by the receiver, the receiver performs a CCA sensing over the set of beams. If at least one beam is sensed as busy by the CCA, the receiver does nothing. Otherwise, the receiver sends a Reservation Acknowledgement (RA) message to the transmitter over one beam or over the set of multiple beams via multi-beam Type II transmissions. The RA message may include the identifier of the transmitter and the identifier of the receiver.

Flow continues to 1409 where it is determined whether the transmitter has received the RA message from the receiver. If the transmitter does not receive the RA message after a predetermined period of time, the transmitter starts the single back-off timer in which the back-off timer initialized using a randomly selected value between 0 and a contention window CW. In one embodiment, the contention window for each of the TCI states or beams may be doubled up to the maximum size when a specific RA message is not received within a predetermined time that is different from the back-off timer. The contention window for each of the TCI states or beams may be reset to a minimum size of the contention window when a specific RA message is received within the predetermined time.

If, at 1409, the transmitter receives the RA message from the receiver, flow continues to 1410 where the transmitter may start multi-beam transmissions over the multiple beams simultaneously in an SDM manner using multi-beam Type I transmission for a duration of MCOT. If during the MCOT there is a transmission gap between two successive transmissions that is greater than a predetermine threshold, the transmitter may optionally make a CCA sensing of all the directions for one or several time slots before starting the next transmission.

In one embodiment, when the back-off timer reaches zero at 1407, the flow optionally continues to 1411 where it is determined whether a beam has been sensed idle for a fixed duration beyond the back-off timer. If so, flow continues to 1408 where the transmitter sends a Reservation Request (RR) message either over a single beam or simultaneously over the set of beams using a multi-beam Type II transmission. If not, flow returns to 1403 where the back-off timer for the beam is restarted.

The fifth example embodiment disclosed herein is an extension of the second embodiment, uses RTS/CTS and multiple back-off timers, and involves multiple active beam pairs between TRPs and UE. An example environment for the fifth example embodiment may be similar to the environment depicted in FIG. 1 herein. A transmitter in the present example environment may be, for example, embodied as a base station (or gNB) or as a UE, such as depicted in FIGS. 2 and 3 herein. Additionally, the TX processing chains depicted in at least FIGS. 2 and 3 herein may be configured to perform the fifth embodiment of a channel access procedure for a multi-beam LBT according to the subject matter disclosed herein.

Figure 15:
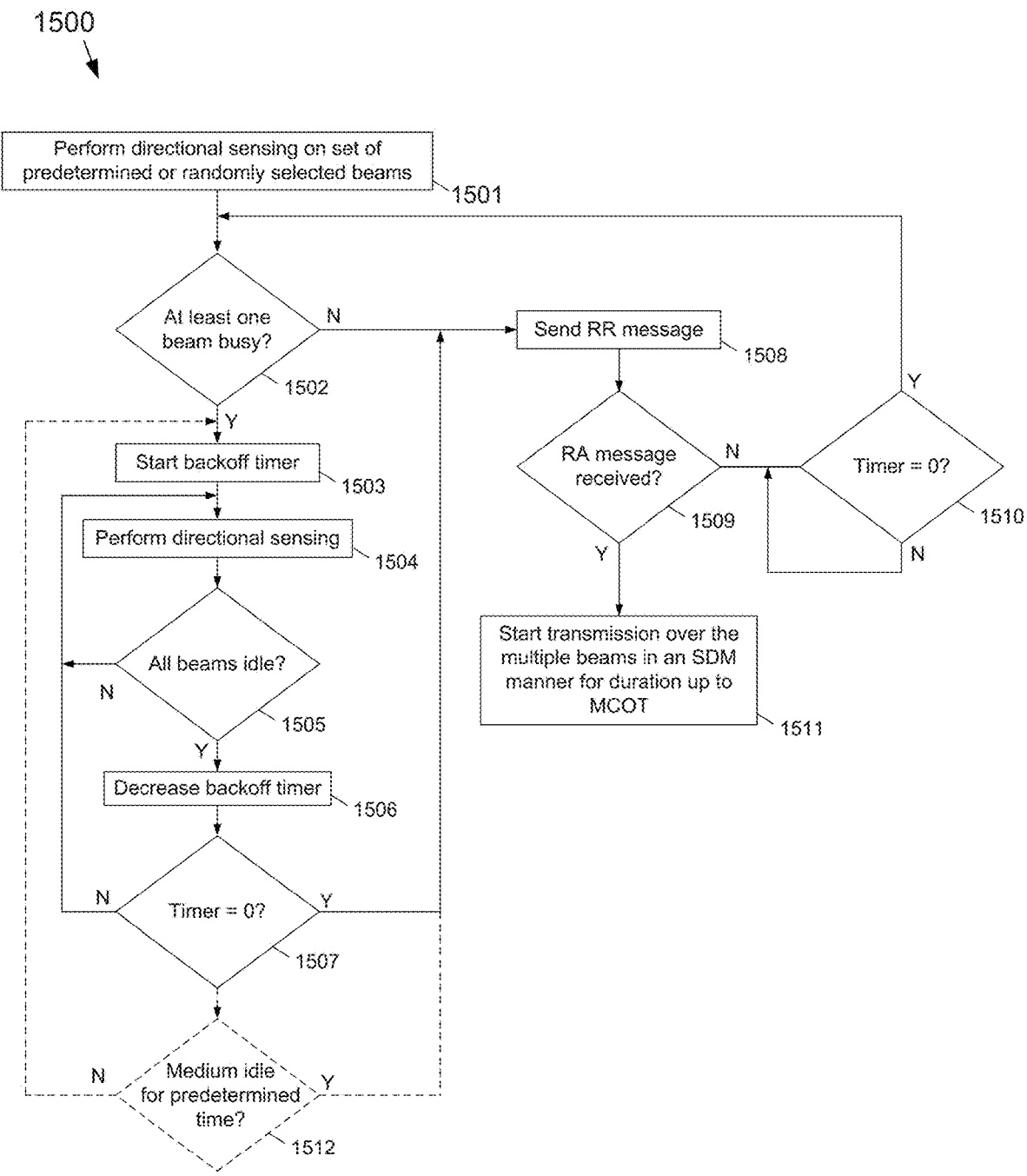
FIG. 15 is a flowchart of an example embodiment of a fifth method of a channel access procedure for a multi-beam LBT using multiple back-off timers for NR-U at 60 GHz according to the subject matter disclosed herein.

FIG. 15 is a flowchart of an example embodiment of a fifth method 1500 of a channel access procedure for a multi-beam LBT using multiple back-off timers for NR-U at 60 GHz according to the subject matter disclosed herein. At 1501, a transmitter, whether at the TRP or at the UE, makes a directional sensing CCA on a set of pre-determined or randomly selected beams (or directions), either sequentially in a set of time slots or simultaneously in one time slot, depending on the capability of the transmitter. The medium in a specific direction may be sensed by comparing a detected energy level in that specific direction to a predetermined threshold value for that specific direction. The medium is busy if the detected energy level is greater than the threshold, otherwise medium is idle.

At 1502, it is determined whether at least one beam is busy. If no beams are sensed as being busy (all beams idle), flow continues to 1508. If, at 1502, at least one beam is sensed as busy, flow continues to 1203 where the transmitter starts a back-off timer corresponding to each beam sensed as busy. Each respective back-off timer may be initialized with a randomly selected value between 0 and CW. The value of CW may be specific to each beam.

At 1504, the transmitter continues making directional sensing on each beam determined to be busy by performing a CCA in every slot time. At 1505, it is determined whether each beam is sensed as idle. If not, flow returns to 1504 and the back-off timer for that beam remains at its current value. If, at 1505, it is determined that a beam is idle, flow continues for that beam to 1506 where the back-off timer corresponding to the beam is decreased by a predetermined amount. At 1507, it is determined whether the back-off timer equals 0. If not, flow returns to 1504.

When the back-off timer reaches zero at 1507, and the set of directional beams has been sensed idle for a fixed duration that is different from the back-off timer, flow continues to 1508 transmitter sends a RR message to the receiver via that particular beam. If multiple beams have been sensed as being idle, transmitter may send a RR message over one of the idle beams. Alternative, if multiple beams have been sensed as idle, the transmitter may send a RR message over the set of idle beams using multi-beam Type II transmissions. The RR message may include an identifier of the transmitter, an identifier of the beam for receiver to perform CCA (e.g., the TCI state or the QCL relation info of the beam), and an identifier of the receiver.

After the RR message has been received at the receiver in the situation in which a RR message has been sent over one beam, the receiver makes a CCA directional sensing on that beam and if the beam is idle, sends a RA message to the transmitter. Alternatively, in the situation in which one RR message is sent over one of multiple idle beams, the receiver sends a RA message via one of the idle beams. Alternatively, in the situation in which multiple beams have been sensed by the receiver as being idle, the receiver may send a RA message over the set of idle beam using multi-beam Type II transmissions. The RA message may include the identifier of the transmitter, the identifier of the receiver, an identifier of the cleared beam (e.g., the TCI state or the QCL relation info of the beam), and a set of suggested CW sizes for the next CCA of other set of beams from the same transmitter over which the receiver cannot send back RA messages after performing an unsuccessful CCA. Alternatively, instead of suggested CW sizes, the RA message may also include the measured medium busy ratio (MBR), which is defined as the % of time when the medium is sensed busy in a given time window.

If a beam over which the RR was sent is sensed at the receiver as busy, the receiver does not do anything.

Flow continues to 1509 where it is determined whether the transmitter has received the RA message from the receiver. If the transmitter does not receive the RA message after a predetermined period of time, flow continues to 1510 measurement on that specific beam, which is sent back to transmitter via another beam over which the receiver sensed a clear CCA. Alternatively, the CW size may be indirectly inferred from a local measurement by the receiver, e.g., MBR on that specific beam that is contained in the RA message on another beam sensed by the receiver as CCA clear.

From 1510, flow continues to 1511, where it is determined whether the individual back-off timer equals 0. If not, flow returns to 1511, if so, flow continues to 1502.

If, at 1509, the transmitter receives the RA message from the receiver, flow continues to 1512 where for the subset of beams senses as being idle and a completed RR/RA message exchange, the transmitter may start a transmission and/or a reception in an SDM manner over multiple beams for a duration of maximum channel occupancy time (MCOT) using Type II transmissions for a duration of maximum channel occupancy time (MCOT).

In one embodiment, when the back-off timer reaches zero at 1507, the flow optionally continues to 1512 where it is determined whether a beam has been sensed idle for a fixed duration beyond the back-off timer. If so, flow continues to 1508 where the transmitter sends a Reservation Request (RR) message either over a single beam or simultaneously over the set of beams using a multi-beam Type II transmission. If not, flow returns to 1503 where the back-off timer for the beam is restarted.

For a half-duplex transmitter, the back-off timers corresponding to the beams sensed as busy are held fixed until the transmissions have completed for the beams sensed to be idle. After the transmission have completed for the beams sensed to be idle, each of the beams sensed to be busy decrement the back-off timer by one when the medium is sensed idle for that specific beam. For a full-duplex transmitter, each of the back-off timers for the beams sensed to be busy is decremented whenever the medium is sensed idle for that particular beam.

The following pseudo code provides an example of a TPR performing a directional sensing CCA for first and second beams for a duration of s.

```
If the detected energy > THS
- TRP starts the backoff counter for the 1st candidate beam. The backoff counter can be initialized
and decremented according to the legacy category 4 LBT in R-16 NR-U;
    If backoff counter == 0,
        TRP acquires the COT and sends the DL data to the UE via 1st beam;
        return;
    End
- TRP performs directional sensing CCA on 2nd candidate beam for a duration s;
    If the detected energy > THS
    - TRP starts the backoff counter for the 2nd candidate beam. The backoff counter can be
initialized
        and decremented according to the legacy category 4 LBT in R-16 NR-U;
            If backoff counter == 0,
                TRP acquires the COT and sends the DL data to the UE via 2nd beam;
                return;
            End
        Else
            TRP acquires the COT and sends the DL data to the UE via 2nd beam;
            return;
        End
    Else
        TRP acquires the COT and sends the DL data to the UE via 1st beam;
    End
``` where the transmitter starts an individual back-off timer in which the back-off timer may be initialized using a randomly selected value between 0 and window CW. The CW size may be directly suggested by the receiver based on the local For UL channel access, a UE acts similarly to a TRP as in a DL channel access to acquire the COT and sends SR to TRP. For DL channel access, TPR performs directional sensing CCA on $1^{st}$ and $2^{nd}$ candidate beam for a duration s.

```
If the detected energy of 1st candidate beam > THS
- TRP starts the backoff counter for the 1st candidate beam. The backoff counter can be initialized
and
    decremented according to the legacy category 4 LBT in R-16 NR-U;
        If backoff counter == 0,
            TRP acquires the COT and sends the DL data to the UE via 1st beam;
        End
Else
    TRP acquires the COT and sends the DL data to the UE via 1st beam;
End
If the detected energy of 2nd candidate beam > THS
    - TRP starts the backoff counter for the 2nd candidate beam. The backoff counter can be initialized
        and decremented according to the legacy category 4 LBT in R-16 NR-U;
            If backoff counter == 0,
                TRP acquires the COT and sends the DL data to the UE via 2nd beam;
                return;
            End
Else
    TRP acquires the COT and sends the DL data to the UE via 2nd beam;
End
```

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may include many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed:

1. A transceiver comprising:
    a receiver coupled to multiple transmission and reception points; and
    a transmitter coupled to the multiple transmission and reception points, the transmitter configured to transmit multiple beams in multiple beam directions during a first channel occupancy time (COT), each beam of the multiple beams being oriented in a direction that is different from a direction of each other beam of the multiple beams,
    the transceiver configured to:
        based on a determination that a transmission gap between successive transmissions of the multiple beams is greater than a threshold value, perform during the transmission gap a clear channel assessment (CCA) on the multiple beams; and
        based on a determination from the CCA that at least one beam of the multiple beams is busy, stop transmission of the multiple beams and repeat the CCA on the multiple beams during a second COT after the first COT.

2. The transceiver of claim 1, wherein transmission of the multiple beams in multiple beam directions is based on a back-off timer reaching zero.

3. The transceiver of claim 2, wherein transmission of the multiple beams in multiple beam directions is based on sensing the multiple beam directions are idle for a predetermined duration beyond a duration of the back-off timer.

4. The transceiver of claim 1, wherein the transmitter determines during the first COT that the transmission gap between the successive transmissions is greater than the threshold value.

5. The transceiver of claim 1, wherein the CCA is performed during the first COT.

6. The transceiver of claim 1, wherein the CCA is performed over the multiple beams over a set of time slots.

7. The transceiver of claim 1, wherein the CCA is performed over the multiple beams simultaneously in one time slot.

8. The transceiver of claim 1, wherein the beam directions are determined before acquiring the first COT.

9. The transceiver of claim 1, wherein the multiple beams are transmitted based on a multi-beam Type I transmission.

10. The transceiver of claim 1, wherein the multiple beams are transmitted according to subscriber data management (SDM).

11. A wireless communication system, comprising:
a transmitter configured to transmit multiple beams in multiple beam directions during a first channel occupancy time (COT), each beam of the multiple beams being oriented in a direction that is different from a direction of each other beam of the multiple beams, the transmitter being further configured to:
based on a determination that a transmission gap between successive transmissions of the multiple beams is greater than a threshold value, perform during the transmission gap a clear channel assessment (CCA) on the multiple beams; and
based on a determination from the CCA that at least one beam of the multiple beams is busy, stop transmission of the multiple beams and repeat the CCA on the multiple beams during a second COT after the first COT.

12. The wireless communication system of claim 11, wherein transmission of the multiple beams in multiple beam directions is based on a back-off timer reaching zero.

13. The wireless communication system of claim 12, wherein transmission of the multiple beams in multiple beam directions is based on sensing the multiple beam directions are idle for a predetermined duration beyond a duration of the back-off timer.

14. The wireless communication system of claim 11, wherein the transmitter determines during the first COT that the transmission gap between the successive transmissions is greater than the threshold value.

15. The wireless communication system of claim 11, wherein the CCA is performed during the first COT.

16. The wireless communication system of claim 11, wherein the CCA is performed over the multiple beams over a set of time slots.

17. The wireless communication system of claim 11, wherein the CCA is performed over the multiple beams simultaneously in one time slot.

18. A method for accessing a wireless medium, the method comprising:
transmitting multiple beams in multiple beam directions during a first channel occupancy time (COT), each beam of the multiple beams being oriented in a direction that is different from a direction of each other beam of the multiple beams;
based on determining that a transmission gap between successive transmissions of the multiple beams is greater than a threshold value, performing during the transmission gap a clear channel assessment (CCA) on the multiple beams; and
based on determining from the CCA that at least one beam of the multiple beams is busy, stopping transmission of the multiple beams and repeating the CCA on the multiple beams during a second COT after the first COT.

19. The method of claim 18, wherein transmission of the multiple beams in multiple beam directions is based on a back-off timer reaching zero.

20. The method of claim 19, wherein transmission of the multiple beams in multiple beam directions is based on sensing the multiple beam directions are idle for a predetermined duration beyond a duration of the back-off timer.

* * * * *